US012683997B2

(12) United States Patent
Smith et al.

(10) Patent No.: US 12,683,997 B2
(45) Date of Patent: Jul. 14, 2026

(54) DISTRIBUTED SYSTEM FOR CYBERSECURITY DATA COLLECTION AND TRAFFIC MASKING

(71) Applicant: SecurityScorecard, Inc., New York, NY (US)

(72) Inventors: Jared Smith, New York, NY (US); Ryan Sherstobitoff, New York, NY (US); Danil Stolachshuk, New York, NY (US); Duaa Abdelgadir, New York, NY (US)

(73) Assignee: SecurityScorecard, Inc., New York, NY (US)

( * ) Notice: Subject to any disclaimer, the term of this patent is extended or adjusted under 35 U.S.C. 154(b) by 436 days.

(21) Appl. No.: 17/952,393

(22) Filed: Sep. 26, 2022

(65) Prior Publication Data

US 2024/0106850 A1      Mar. 28, 2024

(51) Int. Cl.
*H04L 9/40*              (2022.01)

(52) U.S. Cl.
CPC ...... *H04L 63/1433* (2013.01); *H04L 63/0428* (2013.01); *H04L 63/1425* (2013.01); *H04L 63/1441* (2013.01)

(58) Field of Classification Search
CPC ............. H04L 63/1433; H04L 63/0428; H04L 63/1425; H04L 63/1441
See application file for complete search history.

(56) References Cited

U.S. PATENT DOCUMENTS

| | | | | |
|---|---|---|---|---|
| 11,706,241 B1* | 7/2023 | Cross | ...................... | H04L 63/20 726/25 |
| 2007/0277242 A1* | 11/2007 | Baker | ................. | H04L 63/1408 726/25 |
| 2016/0044054 A1* | 2/2016 | Stiansen | ............. | H04L 63/1416 726/24 |
| 2018/0191757 A1* | 7/2018 | Epstein | ................. | H04L 67/535 |
| 2018/0287903 A1* | 10/2018 | Joshi | ..................... | H04L 43/062 |
| 2019/0166143 A1* | 5/2019 | Kim | ........................ | H04L 41/40 |
| 2020/0233754 A1* | 7/2020 | Spurlock | .............. | G06F 3/0646 |
| 2020/0394329 A1* | 12/2020 | Jayaprakash | ....... | G06F 11/3644 |
| 2021/0234898 A1* | 7/2021 | Desai | .................... | H04L 63/104 |
| 2022/0368727 A1* | 11/2022 | Crabtree | ............. | G06F 21/6218 |

(Continued)

*Primary Examiner* — Darshan I Dhruv

(74) *Attorney, Agent, or Firm* — Dority & Manning, P.A.

(57) ABSTRACT

The present disclosure provides a systems, methods, and computer-readable media for distributed cybersecurity data collection and traffic masking. According to some aspects, a system includes a server and multiple logical groups of node devices associated with respective characteristics. The characteristics may be related to different geographical or geo-political locations, different scheduled operations, or the like. A first node device of a first logical group may execute a data collection agent based on first parameter values corresponding to characteristics of the logical first group to communicate first masked traffic to a network target to obtain first cybersecurity data. A second node device of a second logical group may execute the data collection agent based on second parameter values corresponding to characteristics of the second logical group to communicate second masked traffic to the network target to obtain second cybersecurity data. The node devices send the respective cybersecurity data to the server.

19 Claims, 5 Drawing Sheets

(56)　　　　　References Cited

U.S. PATENT DOCUMENTS

2023/0239314 A1*　7/2023　Rose ...................... H04L 63/20
　　　　　　　　　　　　　　　　726/22
2023/0247048 A1*　8/2023　Samosseiko .......... H04L 63/145
　　　　　　　　　　　　　　　　726/23

* cited by examiner

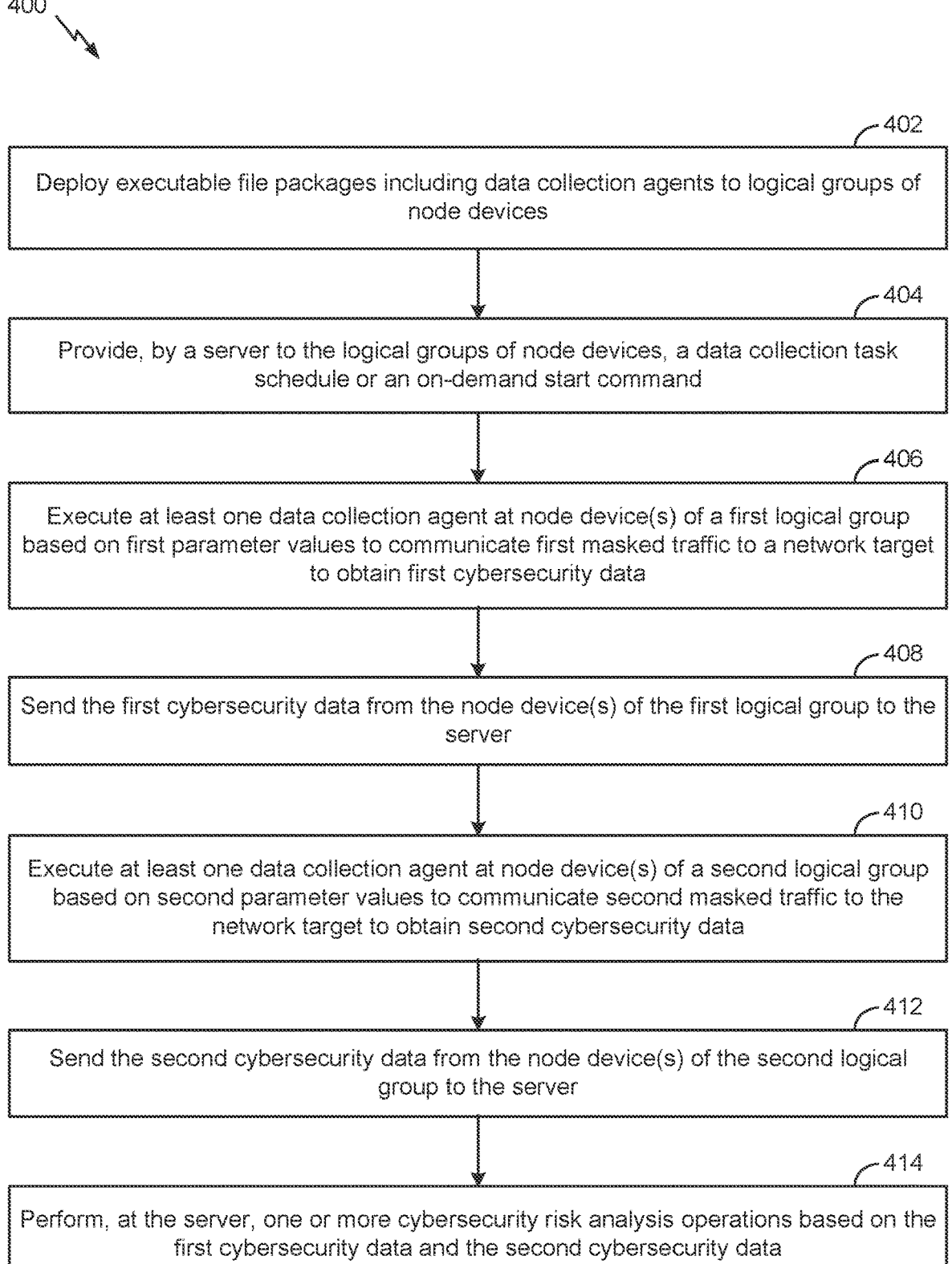

400

402

Deploy executable file packages including data collection agents to logical groups of node devices

404

Provide, by a server to the logical groups of node devices, a data collection task schedule or an on-demand start command

406

Execute at least one data collection agent at node device(s) of a first logical group based on first parameter values to communicate first masked traffic to a network target to obtain first cybersecurity data

408

Send the first cybersecurity data from the node device(s) of the first logical group to the server

410

Execute at least one data collection agent at node device(s) of a second logical group based on second parameter values to communicate second masked traffic to the network target to obtain second cybersecurity data

412

Send the second cybersecurity data from the node device(s) of the second logical group to the server

414

Perform, at the server, one or more cybersecurity risk analysis operations based on the first cybersecurity data and the second cybersecurity data

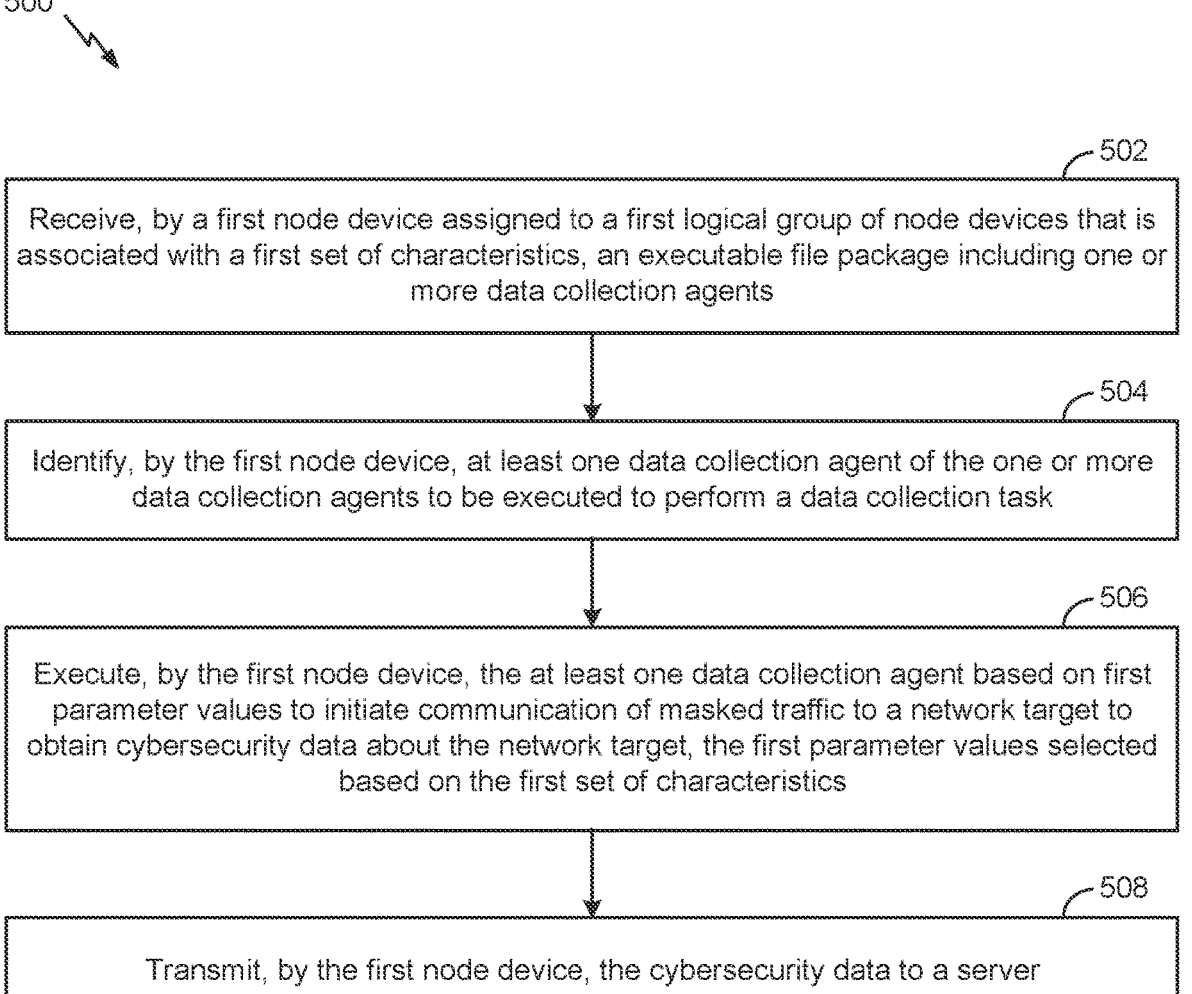

502

Receive, by a first node device assigned to a first logical group of node devices that is associated with a first set of characteristics, an executable file package including one or more data collection agents

504

Identify, by the first node device, at least one data collection agent of the one or more data collection agents to be executed to perform a data collection task

506

Execute, by the first node device, the at least one data collection agent based on first parameter values to initiate communication of masked traffic to a network target to obtain cybersecurity data about the network target, the first parameter values selected based on the first set of characteristics

508

Transmit, by the first node device, the cybersecurity data to a server

*FIG. 5*

DISTRIBUTED SYSTEM FOR CYBERSECURITY DATA COLLECTION AND TRAFFIC MASKING

TECHNICAL FIELD

The present application is generally related to the technical field of cybersecurity technology, and more particularly, but not by way of limitation, to distributed systems for performing cybersecurity data collection and traffic masking.

BACKGROUND

Security risks to an entity, such as a corporation, have become increasingly complex. Many threats to corporate information security, including those attributable to terrorism, organized crime, and/or individual hackers can be asymmetric, distributed, and/or networked, making cybersecurity risks more difficult to manage. Further, a corporation typically has one or more relationships (e.g., a customer/vendor relationship, a vendor/vendor relationship, a parent/subsidiary relationship, etc.) with other entities to provide and support services (e.g., software-as-a-service applications, etc.) for the corporation. Each of these relationships can impact a cybersecurity risk of the corporation (e.g., because the risk may be dependent upon not only the level of cybersecurity that the corporation has, but also on the level of cybersecurity that its relationship partners have). To manage and evaluate an impact of or vulnerability from a relationship, a corporation may seek to understand the cybersecurity risks associated with potential relationship partners before entering into a relationship. One method for understanding the cybersecurity risks includes contracting with a cybersecurity expert to analyze the cybersecurity risks associated with the potential relationship partners.

To obtain information related to cybersecurity risks of a target under study (e.g., a potential relationship partner of a corporation or enterprise), a cybersecurity expert (or the corporation itself) may perform a variety of data collection tasks related to the target. The data collection tasks may include scanning Internet protocol (IP) ports and IP addresses associated with the target, domain name system (DNS) scanning and resolution, web crawling, and the like. However, obtaining relevant information from these data collection tasks is becoming increasingly difficult. For example, firewalls and other network security options are increasingly capable of identifying scanning operations that originate from the same entity and either blocking such scans or providing incorrect information, thereby limiting the effectiveness of some data collection tasks. Although technology for masking the identity of the sender of network traffic exist, such as proxies or virtual private networks (VPNs), these technologies are designed to handle the traffic patterns associated with individual or groups of users performing routine network activities, such as browsing websites, streaming data, playing video games, running applications, etc. These technologies are not designed to handle the traffic patterns of high speed scanning and data collection operations. Additionally, the results of such scanning may be different for different entities, such as entities in different geographical or geopolitical locations, entities that use different applications or hardware to access a network (e.g., the Internet), and the like, due to differences in network topologies and equipment, weather or other physical characteristics, communication protocols, geopolitical restrictions and access policies, current activity on the network, and the like.

Therefore, the results of data collection tasks by a particular entity may represent only a narrow snapshot of a target's cybersecurity risks.

BRIEF SUMMARY

Aspects of the present disclosure provide systems, methods, and computer-readable storage media that provide distributed cybersecurity data collection and traffic masking that provides scheduled and on-demand data collection capabilities. For example, a cybersecurity data collection system described herein includes a server that manages and receives results from multiple node devices assigned to different logical groups. The node devices may be assigned to logical groups based on grouping criteria associated with the node devices, such as geographic locations, geopolitical locations, assigned data collection tasks, relationship to particular entities, types of devices, hardware, or applications supported by the various node devices, network presence or access characteristics, other grouping criteria, or a combination thereof. Executable file packages that contain multiple data collection agents are deployed to the node devices, such that upon instructions or scheduling from the server, each node device may execute one or more data collection agents to perform data collection tasks assigned to the node devices. As non-limiting examples, the data collection agents may include Internet protocol (IP) port scanning agents, domain name system (DNS) mapping agents, web crawling agents, or the like.

Each node device executes the respective data collection agents based on parameter values selected based on characteristics of the logical group that includes the respective node device. The parameters may include particular parameters of a modified network stack to enable performance of the data collection tasks while using a proxy, a virtual private network (VPN), or the like, to mask the traffic such that a target does not identify the server as an originator of the traffic and such that the traffic is not detected as performing data collection, and therefore blocked by firewalls or other technology. For example, the parameters may include a timing alignment parameter, a frequency parameter, metadata included in the traffic, or the like. Because the parameters are selected based on the characteristics of the logical groups, node devices in different logical groups are able to adapt traffic based on conditions associated with those node devices, instead of using a single set of parameters that may result in failure or detection of the traffic as data collection. For example, if the logical groups are grouped based on geographic or geopolitical location, node devices of a first logical group may select parameters that reflect network conditions in their geographic region or firewall access in their geopolitical region, and node devices of a second logical group may select different parameter values due to differences in their geographic location or firewall access in their geopolitical region.

After communicating respective masked traffic to network targets to obtain (e.g., generate) cybersecurity data, the node devices send the cybersecurity data to the server for further processing and performance of one or more cybersecurity operations. For example, the server may use the received cybersecurity data to determine a cybersecurity risk score for an enterprise, to track cybersecurity threats or attacks, to generate a map of cybersecurity risks for one or more regions, or the like. Thus, the cybersecurity data collection system described herein provides a distributed, modular cybersecurity data collection system capable of viewing network(s) (e.g., the Internet) the same as a hacker or other malicious actor, such as from different geographic or geopolitical regions, from the perspective of different applications, different network access technologies or protocols, or the like. The system is modular in that, due to distribution of executable file packages, node devices may be set up and able to perform any of one or more different data collection tasks without extensive setup or being managed by a network administrator. Instead, the server may manage and control performance of cybersecurity data collection tasks by node devices distributed across multiple logical divisions, thereby supporting a multi-region (e.g., global) distributed and scalable data collection system that provides traffic masking to prevent, or reduce the likelihood, of rejection of data collection by targets across the Internet or other networks.

According to one aspect, a system for distributed cybersecurity data collection and traffic masking includes a first node device assigned to a first logical group of node devices that is associated with a first set of characteristics. The first node device includes a first memory storing a first executable file package. The first executable file package includes one or more data collection agents. The first node device also includes a first processor coupled to the first memory. The first processor is configured to execute at least one data collection agent of the one or more data collection agents based on first parameter values to initiate communication of first masked traffic to a network target to obtain first cybersecurity data about the network target. The first parameter values are selected based on the first set of characteristics. The system also includes a second node device assigned to a second logical group of node devices that is associated with a second set of characteristics. The second node device includes a second memory storing a second executable file package. The second executable file package includes the one or more data collection agents. The second node device also includes a second processor coupled to the second memory. The second processor is configured to execute at least one data collection agent of the one or more data collection agents based on second parameter values to initiate communication of second masked traffic to the network target to obtain second cybersecurity data about the network target. The second parameter values are selected based on the second set of characteristics. The system further includes a server communicatively coupled to the first node device and the second node device. The server includes a third memory and a third processor coupled to the third memory. The third processor is configured to receive the first cybersecurity data from the first node device and to receive the second cybersecurity data from the second node device.

According to another aspect, a method for distributed cybersecurity data collection and traffic masking is described. The method includes receiving, by a first node device assigned to a first logical group of node devices that is associated with a first set of characteristics, an executable file package including one or more data collection agents. The method also includes identifying, by the first node device, at least one data collection agent of the one or more data collection agents to be executed to perform a data collection task. The method includes executing, by the first node device, the at least one data collection agent based on first parameter values to initiate communication of masked traffic to a network target to obtain cybersecurity data about the network target. The first parameter values are selected based on the first set of characteristics. The method further includes transmitting, by the first node device, the cybersecurity data to a server.

According to another aspect, a computer program product includes a computer-readable storage device, such as a non-transitory computer-readable storage medium, includes instructions which, when executed by one or more processors, cause the one or more processors to perform operations for distributed cybersecurity data collection and traffic masking. The operations include receiving, by a first node device assigned to a first logical group of node devices that is associated with a first set of characteristics, an executable file package including one or more data collection agents. The operations also include identifying at least one data collection agent of the one or more data collection agents to be executed to perform a data collection task. The operations include executing the at least one data collection agent based on first parameter values to initiate communication of masked traffic to a network target to obtain cybersecurity data about the network target. The first parameter values are selected based on the first set of characteristics. The operations further include transmitting the cybersecurity data to a server.

The foregoing has outlined rather broadly the features and technical advantages of the present disclosure in order that the detailed description of the invention that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying figures, in which:

FIG. 4 is a flow diagram of an example of a method for distributed cybersecurity data collection and traffic masking according to one or more aspects; and FIG. 5 is a flow diagram of another example of a method for distributed cybersecurity data collection and traffic masking according to one or more aspects.

DETAILED DESCRIPTION

Figure 1:
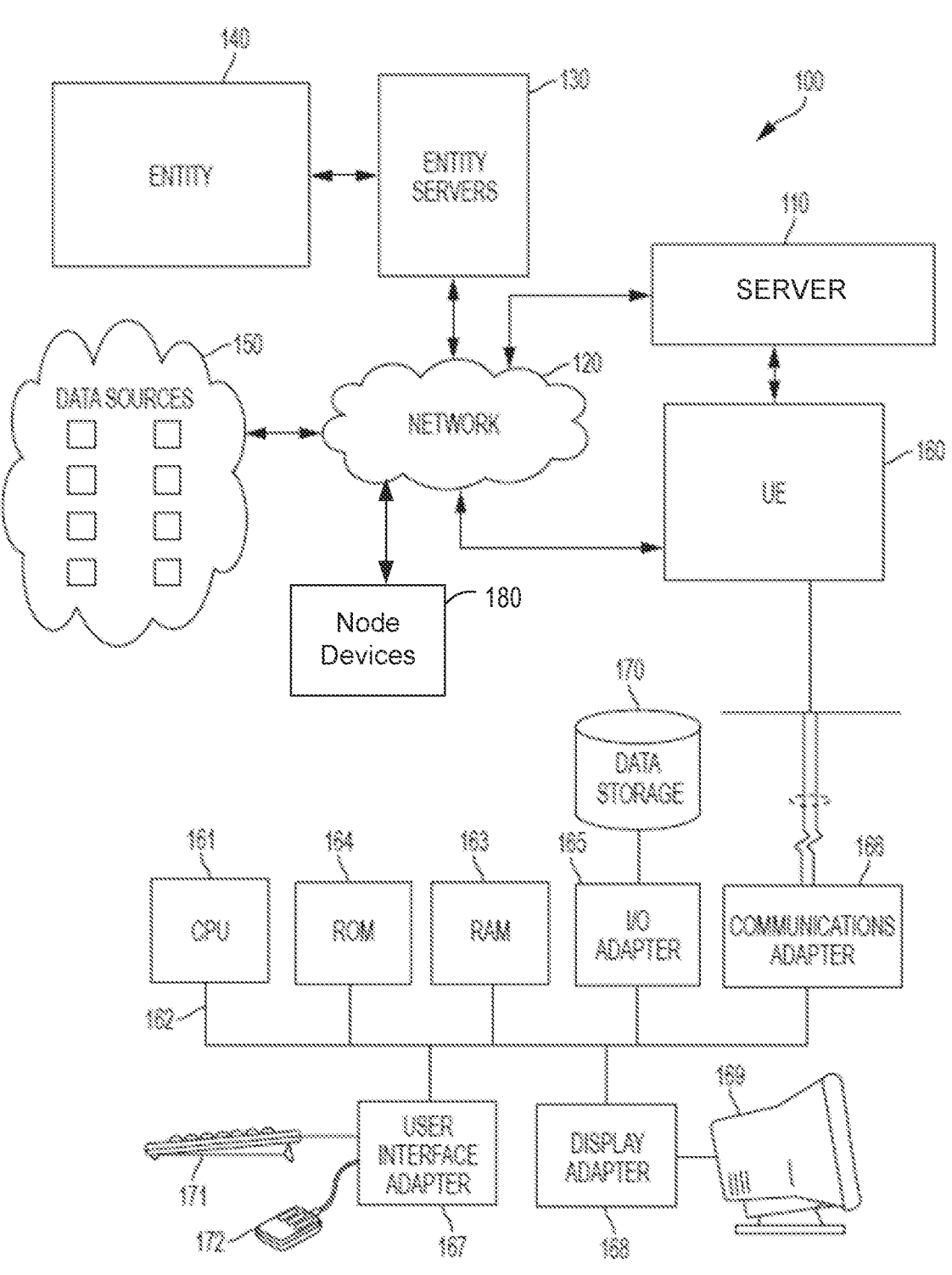
FIG. 1 is a block diagram of an example of a system that includes a server for controlling distributed cybersecurity data collection and traffic masking according to one or more aspects.

Inventive concepts utilize a distributed system for cybersecurity data collection and traffic masking. For example, a cybersecurity data collection system may include a server that manages and receives results from multiple node devices assigned to different logical groups. The node devices may be assigned to logical groups based on grouping criteria associated with the node devices, such as geographic locations, geopolitical locations, assigned data collection tasks, relationship to particular entities, types of devices, hardware, or applications supported by the various node devices, network presence or access characteristics, other grouping criteria, or a combination thereof. Executable file packages that contain multiple data collection agents are deployed to the node devices, such that upon instructions or scheduling from the server, each node device may execute one or more data collection agents to perform data collection tasks assigned to the node devices, such as Internet protocol (IP) port scanning, domain name system (DNS) mapping, web crawling, vulnerability analysis, or the like, as non-limiting examples.

The server may schedule node devices to perform certain data collection tasks, or may provide on-demand instructions to perform real-time (or near real-time) data collection tasks. Based on control signals from the server, a node device may select and execute at least one data collection agent to perform the assigned data collection task. The node device may execute the data collection agent based on parameter values selected based on characteristics of the logical group that includes the node device. For example, the node device may select values of a timing alignment parameter, a frequency parameter, metadata to include in network traffic, or the like, to enable performance of the data collection tasks while using a proxy, a virtual private network (VPN), or the like, to mask the traffic. Selecting the parameter values based on the logical grouping allows the node device to adapt to circumstance of the node device that are different than node devices in other logical groups, such as due to geographic or geopolitical location, as a non-limiting example. After communicating masked traffic to network targets to obtain (e.g., generate) cybersecurity data, the node device may send the cybersecurity data to the server for further processing and performance of one or more cybersecurity operations based on cybersecurity data from multiple node devices. For example, the server may use the received cybersecurity data to determine a cybersecurity risk score for an enterprise, to track cybersecurity threats or attacks, to generate a map of cybersecurity risks for one or more regions, or the like.

The foregoing features provide a system for distributed cybersecurity data collection and traffic masking. This can be advantageous in a number of scenarios. For example, the inventive concepts can be utilized to perform data collection from different locations or using different applications or network access situations in order to provide a global or otherwise multi-region or multi-group view of cybersecurity posture of a network target. This view may match those of hackers or other malicious actors, who may be located in other locations or use other technology than those used by a single server or cloud service provider that provides data collection services. Additionally, because the node devices described herein mask the data collection task traffic, based on the selected parameters, a target may not identify the server as an originator of the traffic and that the traffic is part of data collection (e.g., scanning), as opposed to typical user traffic. For this reason, network targets and their firewalls or other or other security technology may be less likely to block the traffic or provide improper responses. Thus, the cybersecurity data collection system described herein provides a distributed, modular cybersecurity data collection system capable of viewing network(s) (e.g., the Internet) from multiple perspectives without requiring significant management by a network administrator or time and costs to deploy and scale.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may comprise a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the disclosure.

Referring to FIG. 1, a block diagram of system 100 that includes a server 110 (e.g., a cybersecurity assessment server), a communication network 120, an entity server 130, an entity 140, data sources 150, user station 160, and node devices 180 is shown. Server 110 may include one or more servers that, according to one aspect, are configured to perform several of the functions described herein. One or more of the servers comprising server 110 may include memory, storage hardware, software residing thereon, and one or more processors configured to perform functions associated with system 100. For example, components comprising user station 160, such as CPU 161, can be used to interface and/or implement server 110. Accordingly, user station 160 may serve as a cybersecurity data collection portal by which a user may access a distributed cybersecurity data collection system disclosed herein, which in some implementations is part of a cybersecurity risk assessment system. The portal can function to allow multiple users, inside and outside of system 100 (e.g., at multiple instances of user station 160), to interface with one another. One of skill in the art will readily recognize that different server and computer architectures can be utilized to implement server 110, and that server 110 is not limited to a particular architecture so long as the hardware implementing server 110 supports the functions of the cybersecurity risk assessment system disclosed herein.

Communication network 120 may facilitate communication of data between server 110 and data sources 150. Communication network 120 may also facilitate communication of data between server 110 and other servers/processors, such as entity server 130, and other devices, such as user station 160 and node devices 180. Communication network 120 may include a wireless network, a wired network, or a combination thereof. For example, communication network 120 may include any type of communications network, such as a direct PC-to-PC connection, a local area network (LAN), a wide area network (WAN), a modem-to-modem connection, the Internet, intranet, extranet, cable transmission system, cellular communication network, a combination of the above, or any other communications network now known or later developed within the networking arts which permits two or more electronic devices to communicate.

Entity server 130 may include one or more servers which entity 140 uses to support its operations. In some embodiments, server 110 may access entity server 130 to collect information that may be used to calculate an entity's cybersecurity risk. Data sources 150 include the sources from which server 110 collects information to calculate and/or benchmark an entity's cybersecurity risk. Although shown as distinct components, entity server 130, data sources 150, other network devices, or a combination thereof, may serve as a target for performing one or more cybersecurity data collection tasks. The cybersecurity data collection tasks may be performed to calculate and/or benchmark an entity's cybersecurity risk, to monitor and track cyberattacks, to perform on-demand scanning, for other cybersecurity operations, or a combination thereof.

Entity 140 may include any individual, organization, company, corporation, department (e.g., government), or group of individuals. For example, one entity may be a corporation with thousands of employees and headquarters in New York City, while another entity may be a group of one or more individuals associated with a website and having headquarters in a residential home. In a particular implementation, entity 140 includes a business that has a domain and at least one user who can access server 110. For example, the user may access server 110 via an application, such as an application hosted by server 110. To illustrate, the user may have an account (e.g., on behalf of entity 140) and may log in to server 110 via the application, or may not have an account and access the application as a guest. In some implementations, to log in as a guest, the user first needs to receive an invitation, such as an invitation initiated by another entity and/or initiated by server 110 (e.g., the application). Although system 100 shows one entity 140, in other implementations, system 100 includes multiple entities. In a particular implementation, entity 140 may be a client seeking a cybersecurity risk analysis and scoring/benchmarking of their systems, a related entity (e.g., a customer, a vendor, a subsidiary, a partner entity, or the like), an entity in the same industry as the client, or another entity.

Data sources 150 may include any source of data accessible over communication network 120. By way of example, and not limitation, one source of data can include a website associated with a company, while another source of data may be an online database of various information. In general, data sources 150 may be sources of any kind of data, such as domain name data, social media data, multimedia data, internet protocol (IP) address data, and the like. One of skill in the art would readily recognize data sources 150 are not limited to a particular data source, and that any source from which data may be retrieved may serve as a data source so long as it can be accessed via communication network 120.

With respect to user station 160, the central processing unit ("CPU") 161 is coupled to system bus 162. The CPU 161 may be a CPU or microprocessor, a graphics processing unit ("GPU"), and/or microcontroller that has been programmed to perform the functions of server 110. Embodiments are not restricted by the architecture of CPU 161 so long as CPU 161, whether directly or indirectly, supports the operations described herein. The CPU 161 is one component that may execute the various described logical instructions.

User station 160 also comprises random access memory (RAM) 163, which can be synchronous RAM (SRAM), dynamic RAM (DRAM), synchronous dynamic RAM (SDRAM), or the like. User station 160 may utilize RAM 163 to store the various data structures used by a software application. User station 160 may also comprise read only memory (ROM) 164 which can be PROM, EPROM, EEPROM, optical storage, or the like. The ROM may store configuration information for booting user station 160. RAM 163 and ROM 164 hold user and system data, and both RAM 163 and ROM 164 may be randomly accessed.

User station 160 may also comprise an input/output (I/O) adapter 165, a communications adapter 166, a user interface adapter 167, and a display adapter 168. The I/O adapter 165 and/or the user interface adapter 167 may, in certain embodiments, enable a user to interact with user station 160. In a further embodiment, display adapter 168 may display a graphical user interface (GUI) associated with a software or web-based application on a display device 169, such as a monitor or touch screen.

The I/O adapter 165 may couple one or more storage devices 170, such as one or more of a hard drive, a solid state storage device, a flash drive, a compact disc (CD) drive, a floppy disk drive, and a tape drive, to user station 160. Also, data storage devices 170 can be a separate server coupled to user station 160 through a network connection to I/O adapter 165. Communications adapter 166 can be adapted to couple user station 160 to a network, which can be one or more of a LAN, WAN, and/or the Internet. Therefore, in some embodiments, server 110 may be accessed via an online portal. User interface adapter 167 couples user input devices, such as a keyboard 171, a pointing device 172, and/or a touch screen (not shown) to the user station 160. The display adapter 168 can be driven by CPU 161 to control the display on display device 169. Any of devices 161-168 may be physical and/or logical.

The concepts described herein are not limited to the architecture of user station 160. Rather, user station 160 is provided as an example of one type of computing device that can be adapted to perform the functions of server 110 and/or a user interface device. For example, any suitable processor-based device can be utilized including, without limitation, personal data assistants (PDAs), tablet computers, smartphones, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user station 160, or certain components thereof, may reside at, or be installed in, different locations within system 100.

In some implementations, server 110 can comprise a server and/or cloud-based computing platform configured to perform operations and/or execute the steps described herein. Accordingly, server 110 may include a particular purpose computing system designed, configured, or adapted to perform and/or initiate operations, functions, processes, and/or methods described herein and can be communicatively coupled with a number of end user devices (e.g., user station 160), which can be, e.g., a computer, tablet, Smartphone, or other similar end user computing device. Users can interact with server 110 using a device via one or more networks, such as communication network 120, which itself can comprise one or more of a local intranet, a LAN (Local Area Network), a WAN (Wide Area Network), a virtual private network (VPN), and the like. As will be apparent to those of skill in the art, communicative coupling between different devices of system 100 can be provided by, e.g., one or more of wireless connections, a synchronous optical network (SONET) connection, a digital Tl, TN, El or E3 line, Digital Data Service (DDS) connection, DSL (Digital Subscriber Line) connection, an Ethernet connection, and the like.

Node devices 180 may comprise any type of computing device capable of performing data collection operations, such as with respect to data sources 150, entity server 130, or other targets, based on instructions, control signals, and the like, from server 110. For example, node devices 180 may include network nodes, computing devices, PCs, PDAs, tablet computers, smartphones, mobile devices, servers, or the like, configured to act as nodes of a network managed by server 110. Node devices 180 may be communicatively coupled to one another and/or to server 110, data sources 150, entity server 130, other devices, or a combination thereof, via communication network 120 (e.g., the Internet). In some implementations, node devices 180 may be divided into multiple logical groups based on grouping criteria, such as geographic or geopolitical locations, data collection operations scheduled for performance, relationship to particular entities, types of devices, hardware, or applications supported by the various node devices, other grouping criteria, or a combination thereof, as further described below. Additionally or alternatively, node devices 180 may be configured to mask or otherwise obfuscate traffic communicated during performance of one or more data collection operations. For example, node devices 180 may be configured to establish proxies, virtual private networks (VPNs), or the like, to mask an origin and/or destination of communicated traffic, such as masking that traffic originated from server 110 or masking that traffic received by node devices 180 has server 110 as a destination. In some implementations, executable file packages may be deployed to node devices 180 to enable performance of at least some of the data collecting operations and/or the traffic masking operations described herein.

Figure 2:
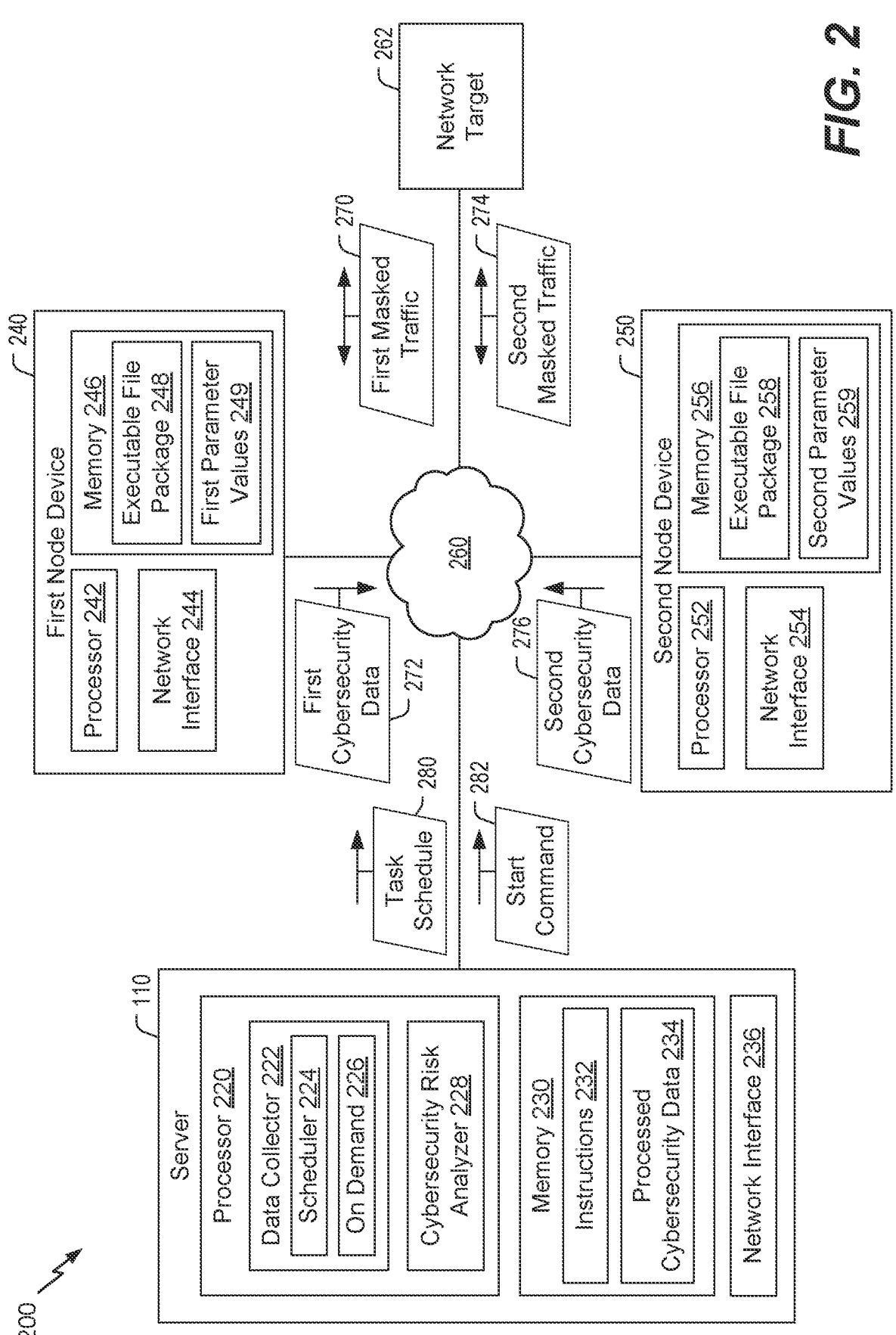
FIG. 2 is a block diagram of another example of a system for distributed cybersecurity data collection and traffic masking according to one or more aspects.

Referring to FIG. 2, a block diagram of a system (e.g., a distributed system) for distributed cybersecurity data collection and traffic masking according to one or more aspects is shown as a system 200. System 200 may include or correspond to at least a portion of system 100. System 200 includes server 110, a first node device 240, a second node device 250, a communication network 260, and a network target 262. In some implementations, system 200 (or a portion thereof) may include or correspond to system 100 of FIG. 1. For example, server 110 of FIG. 2 may include or correspond to server 110 of FIG. 1, communication network 260 may include or correspond to communication network 120, node devices 240 and 250 may include or correspond to node devices 180, and network target 262 may include or correspond to entity server 130 or data sources 150, as non-limiting examples.

In some implementations, system 200 (e.g., server 110, first node device 240, and second node device 250) is operated and maintained by a cybersecurity monitoring organization, and network target 262 includes or corresponds to a particular entity that engages the cybersecurity monitoring organization to determine and/or benchmark the particular entity's cybersecurity risks, or to an entity that is related to the particular entity, such as a customer, a vendor, a partner, a service provider, a competitor in the same industry, or the like. In some other implementations, network target 262 includes or corresponds to one of a plurality of entities monitored by the cybersecurity monitoring organization to monitor and track cybersecurity threats and attacks, an entity of a business sector, a geographical grouping, a geopolitical grouping, or other grouping that the cybersecurity monitoring organization is monitoring or establishing a baseline cybersecurity risk measurements, an entity selected for on-demand scanning or monitoring by the cybersecurity monitoring organization or a client, or another type of entity communicatively coupled to communication network 260 (e.g., to the Internet).

Server 110 may include one or more processors 220, a memory 230 (e.g., one or more memory devices), and a network interface 236. Network interface 236 may be configured to be communicatively coupled to one or more external devices, such as first node device 240, second node device 250, and/or another device, via one or more networks (e.g., 260). For example, network interface 236 may include a transmitter, a receiver, or a combination thereof (e.g., a transceiver).

Processor 220 may include a CPU (e.g., CPU 161) or microprocessor, a graphics processing unit ("GPU"), a field-programmable gate array (FPGA) device, an application-specific integrated circuit (ASIC), another hardware device, a firmware device, a microcontroller, or any combination thereof that has been programmed to perform the functions described herein with reference to server 110. As shown in FIG. 2, in an implementation, server 110 (e.g., processor 220) may comprise a data collector 222 (e.g., a data collector module) and a cybersecurity risk analyzer 228 (e.g., a cybersecurity risk analyzer module). The data collector 222 may include a scheduler 224 (e.g., a scheduler module) and an on demand 226 (e.g., an on demand module). In some implementations, server 110 (e.g., processor 220 or modules 222, 224, 226, 228) may be configured to execute one or more routines that perform various operations as described further herein. A module is "[a] self-contained hardware or software component that interacts with a larger system." Alan Freedman, "The Computer Glossary" 268 (8th ed. 1998). A module may comprise a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

Memory 230 includes (e.g., is configured to store) instructions 232 and processed cybersecurity data 234. For example, memory 230 may store instructions 232, that when executed by the one or more processors 220, cause the processor(s) 220 to perform functions, methods, processes, operations as described further herein. In some implementations, instructions 232 may include or be arranged as an application (e.g., a software program) associated with cybersecurity risk assessment and/or cybersecurity data collection. For example, the application may provide a portal via which one or more entities and/or users interact with and access server 110. In some implementations, memory 230 includes multiple memories accessible by processor 220. In some such implementations, one or more of the memories may be external to server 110. To illustrate, at least one memory may include or correspond to a database accessible to server, such as a database that stores processed cybersecurity data 234, cybersecurity risk scores, cybersecurity threat and/or attack information, or the like.

In some implementations, one or more of modules (e.g., 222, 224, 226, 228) may locally reside in memory 230 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

Processed cybersecurity data 234 may include cybersecurity received from node devices, such as node devices 240 and 250, and/or one or more other entities, and processed by server 110 (e.g., by cybersecurity risk analyzer 228). To illustrate, processed cybersecurity data 234 may include cybersecurity risk scores, cybersecurity risk benchmarks, cybersecurity ratings, cybersecurity attack information, cybersecurity risk information, IP addresses, port mappings, fingerprint data, scanning script outputs, common vulnerabilities and exposures (CVE) information, other information related to cybersecurity, or a combination thereof. As a non-limiting example, processed cybersecurity data 234 may include cybersecurity scores using one or more of the techniques described in commonly-owned U.S. Pat. No. 9,501,647, entitled "CALCULATING AND BENCHMARKING AN ENTITY'S CYBERSECURITY RISK SCORE," and commonly-owned U.S. Pat. No. 10,614,401, entitled "REDUCING CYBERSECURITY RISK LEVEL OF A PORTFOLIO OF COMPANIES USING A CYBERSECURITY RISK MULTIPLIER," the content of each of which is incorporated herein by reference in its entirety.

Referring to processor 220, data collector 222 may comprise one or more routines, executable by one or more processors (e.g., CPU 161 of FIG. 1) or processor 220 to manage and control one or more data collection tasks performed by node devices (e.g., node devices 240 and 250). For example, data collector 222 may be configured to interact with node devices 240 and 250 to manage and support performance of data collection tasks performed by various data collection agents executed by node devices 240 and 250, and data collector 222 may be configured to ingest streaming cybersecurity data received from node devices 240 and 250 resulting from the performance of the data collection tasks. Cybersecurity data received and ingested by data collector 22 may be provided to one or more of the other modules described herein, such as cybersecurity risk analyzer 228. In some implementations, data collector 222 is configured to cause periodically scheduled performance of data collection tasks. For example, scheduler 224 may comprise one or more routines, executable by one or more processors (e.g., CPU 161 of FIG. 1) or processor 220 to schedule periodic performance of data collection tasks by node devices. In some such implementations, scheduler 224 is configured to generate and provide task schedules to the node devices to communicate scheduling information for various scheduled data collection operations. Additionally or alternatively, data collector 222 may be configured to initiate instant or on-demand performance of data collection tasks. For example, on demand 226 may comprise one or more routines, executable by one or more processors (e.g., CPU 161 of FIG. 1) or processor 220 to initiate real-time (or near real-time) performance of data collection tasks by node devices. In some such implementations, on demand 226 is configured to generate and provide start commands, and optionally stop commands, for various data collection operations.

Cybersecurity risk analyzer 228 may comprise one or more routines, executable by one or more processors (e.g., CPU 161 of FIG. 1) or processor 220 to process and/or analyze cybersecurity information received by server 110 to perform one or more cybersecurity operations. For example, cybersecurity risk analyzer 228 may include one or more modules as described with reference to commonly-owned U.S. Pat. No. 9,501,647, entitled "CALCULATING AND BENCHMARKING AN ENTITY'S CYBERSECURITY RISK SCORE," and commonly-owned U.S. Pat. No. 10,614,401, entitled "REDUCING CYBERSECURITY RISK LEVEL OF A PORTFOLIO OF COMPANIES USING A CYBERSECURITY RISK MULTIPLIER," the content of each of which is incorporated herein by reference in its entirety. In some implementations, cybersecurity risk analyzer 228 may be configured to determine or generate cybersecurity risk scores, cybersecurity risk benchmarks, cybersecurity ratings, cybersecurity attack information, cybersecurity risk information, IP addresses mappings, port mappings, fingerprint data, scanning script outputs, CVE vulnerability checks, other information related to cybersecurity, or a combination thereof.

First node device 240 may include one or more processors 242, a network interface 244, and a memory 246 (e.g., one or more memory devices). Processor 242 may include a CPU or microprocessor, a GPU, a FPGA device, an ASIC, another hardware device, a firmware device, a microcontroller, or any combination thereof that has been programmed to perform the functions. Network interface 244 may be configured to be communicatively coupled to one or more external devices, such as server 110, second node device 250, network target 262, and/or another device, via one or more networks (e.g., 260). For example, network interface 244 may include a transmitter, a receiver, or a combination thereof (e.g., a transceiver).

Memory 246 includes (e.g., is configured to store) instructions, an executable file package 248, and first parameter values 249. For example, memory 246 may store instructions (not shown), that when executed by the one or more processors 242, cause the processor(s) 242 to perform functions, methods, processes, operations as described further herein. In some implementations, the instructions may include or be arranged as an application (e.g., a software program) associated with cybersecurity data collection tasks. In some implementations, memory 246 includes multiple memories accessible by processor 242. In some such implementations, one or more of the memories may be external to first node device 240. Executable file package 248 may be deployed by server 110, or another source, and may include files, libraries, linking information, permissions, an operating system or other control executables, and the like, to enable performance of the data collection tasks at different devices or in different computing environments. In some implementations, executable file package 248 may include or correspond to a "container", such as a Docker container, as a non-limiting example. Executable file package 248 may include one or more data collection agents to enable performance or respective data collection tasks. For example, the one or more data collection agents may include an internet protocol (IP) address scanning agent, an IP port scanning agent, a domain name system (DNS) scanning agent, a web crawling agent, a fingerprinting agent, a script running agent, a CVE vulnerability checking agent, an IPv4 Internet scanning agent which may be configured to perform Secure Sockets Layer (SSL) scanning, sub-domain scanning, or targeted scanning, or the like. First parameter values 249 may include or correspond to parameter values used to execute the data collection agents or otherwise perform the data collection tasks initiated by server 110. First parameter values 249 may be selected based on characteristics of a first logical grouping of node devices that includes first node device 240, as further described herein.

Second node device 250 may include one or more processors 252, a network interface 254, and a memory 256 (e.g., one or more memory devices). Processor 252 may include a CPU or microprocessor, a GPU, a FPGA device, an ASIC, another hardware device, a firmware device, a microcontroller, or any combination thereof that has been programmed to perform the functions. Network interface 254 may be configured to be communicatively coupled to one or more external devices, such as server 110, first node device 240, network target 262, and/or another device, via one or more networks (e.g., 260). For example, network interface 254 may include a transmitter, a receiver, or a combination thereof (e.g., a transceiver).

Memory 256 includes (e.g., is configured to store) instructions, an executable file package 258, and second parameter values 259. For example, memory 256 may store instructions (not shown), that when executed by the one or more processors 252, cause the processor(s) 252 to perform functions, methods, processes, operations as described further herein. In some implementations, the instructions may include or be arranged as an application (e.g., a software program) associated with cybersecurity data collection tasks. In some implementations, memory 256 includes multiple memories accessible by processor 252. In some such implementations, one or more of the memories may be external to second node device 250. Executable file package 258 may be deployed by server 110, or another source, and may include files, libraries, linking information, permissions, an operating system or other control executables, and the like, to enable performance of the data collection tasks at different devices or in different computing environments. In some implementations, executable file package 258 may include or correspond to a "container", such as a Docker container, as a non-limiting example. Executable file package 258 may include one or more data collection agents to enable performance or respective data collection tasks. For example, the one or more data collection agents may include an IP address scanning agent, an IP port scanning agent, a DNS scanning agent, a web crawling agent, a fingerprinting agent, a script running agent, a CVE vulnerability checking agent, or the like. In some implementations, executable file package 248 and executable file package 258 are the same executable file package deployed to all node devices of system 200. Alternatively, executable file package 248 may include a subset of the data collection agents included in executable file package 258, or vice versa. Second parameter values 259 may include or correspond to parameter values used to execute the data collection agents or otherwise perform the data collection tasks initiated by server 110. Second parameter values 259 may be selected based on characteristics of a second logical grouping of node devices that includes second node device 250, as further described herein.

Communication network 260 may facilitate communication of data between server 110 and node devices 240 and 250. Communication network 260 may also facilitate communication of data between node devices 240 and 250 and other devices, such as network target 262. Communication network 260 may include a wireless network, a wired network, or a combination thereof. For example, communication network 260 may include any type of communications network, such as a direct PC-to-PC connection, a LAN, a WAN, a modem-to-modem connection, the Internet, intranet, extranet, cable transmission system, cellular communication network, a combination of the above, or any other communications network now known or later developed within the networking arts which permits two or more electronic devices to communicate.

During operation of system 200, node devices may be assigned to different logical groups based on different characteristics or grouping criteria. For example, first node device 240 may be assigned to a first logical group of node devices and second node device 250 may be assigned to a second logical group of node devices. Although one node device is shown for each of the logical groupings in FIG. 2, in other implementations, the logical groupings may include multiple (e.g., two or more) node devices, there may be more than two logical groupings, or both. The grouping criteria may include any criteria that result in grouping node devices together that have common characteristics that may be relevant to performing data collection operations. For example, the grouping criteria may include geographic locations of the node devices, geopolitical locations (e.g., countries, states, provinces, cities, counties, towns, governmental regions, or the like), data collection tasks assigned to the node devices, relationships to particular entities, types of devices, hardware, or applications supported by the various node devices, communication protocols used by the various node devices, other grouping criteria, or a combination thereof. As a particular example, the first logical group of node devices may include one or more node devices (e.g., first node device 240) located within a first geographic or geopolitical region, such as the United States, and the second logical group of node devices may include one or more node devices (e.g., second node device 250) located within a second geographic or geopolitical region, such as Germany, Israel, or China, that is different than the first geographic or geopolitical region. As another particular example, the first logical group of node devices may include one or more node devices (e.g., first node device 240) assigned to perform a first data collection task, such as IP mapping, and the second logical group of node devices may include one or more node devices (e.g., second node device 250) assigned to perform a second data collection task, such as web crawling, that is different than the first data collection task. Additional examples of logical groupings of node devices are described further herein with reference to FIG. 3.

Server 110 initiates performance of data collection tasks by node devices according to one or more schedules, which may be preprogrammed or based on user input (e.g., from user station 160), or on-demand (e.g., based on user request, based on a trigger from an application executed by server 110, etc.). In some implementations, server 110 may send task schedule 280 to node devices 240 and 250 to provide information related to scheduled data collection tasks. For example, task schedule 280 may indicate identifiers of one or more scheduled data collection tasks, start times of one or more scheduled data collection tasks, durations of one or more scheduled data collection tasks, end times of one or more data collection tasks, other scheduling information, or a combination thereof. The scheduled data collection tasks may be scheduled for one-time performance or for periodic or otherwise recurring performance, and such scheduling may be indicated by information included in task schedule 280. In some implementations, server 110 sends task schedule 280 only to node devices that are assigned to perform one of the data collection tasks indicated by task schedule 280. Alternatively, server 110 may send task schedule 280 to any or all node devices, and task schedule 280 (or other information communicated by server 110 or preprogrammed at the node devices) may indicate assignment of data collection tasks to various node devices.

In some other implementations, server 110 sends start command 282 (e.g., an on-demand start command) to node devices 240 and 250 to initiate on-demand data collection tasks. For example, a user may provide input (e.g., via user station 160) to initiate an on-demand data collection task, or an application being executed at server 110, such as a cybersecurity risk analysis application, may automatically trigger an asynchronous data collection task. Responsive to either the user input or the triggering, server 110 may send start command 282 to one or more node devices. Start command 282 may include an indication of one or more data collection tasks to be performed, and optionally information assigning the one or more data collection tasks to various node devices. Alternatively, server 110 may send start command 282 to individual or groups of node devices that are assigned to perform the data collection task(s) indicated by start command 282. In some implementations, data collection task(s) indicated by start command 282 are designated to override any task being performed by recipient node devices. In some other implementations, particular node device(s) are designated to be available for on-demand data collection tasks (e.g., the node device(s) are not scheduled for schedule-based data collection tasks), and server 110 sends start command 282 to the particular node device(s). By supporting initiation of data collection tasks using task schedule 280 and start command 282, system 100 supports both scheduled and on-demand data collection operations, thereby improving utility of system 100 as compared to systems that are not capable of supporting both synchronous (e.g., scheduled) and asynchronous (e.g., on-demand) data collection operations.

In some implementations, server 110 determines which node devices to assign to node device groups and to data collection tasks based on targets of the tasks to be performed. For example, a user may request performance of a particular type of data collection in a particular time period, or from a particular number of locations, or using particular types of communication protocols, and server 110 may assign data collection tasks to the appropriate node devices to satisfy the targets while also balancing other criteria such as network use, resource use, node device availability, priority of the request, and the like. In some implementations, if the available node devices are insufficient to satisfy the targets associated with the request, server 110 may identify one or more candidate node devices that are available and may deploy executable file packages to the candidate node devices to incorporate the candidate node devices into system 200, including assigning the accepted node devices to various logical groups. For example, a cybersecurity company that owns or operates server 110 may contract with cloud service or other network service providers to have access to additional network devices on an on-demand or other type of basis, and server 110 may identify one or more of these candidate node devices for inclusion in system 200 in order to satisfy the targets of the request. Additionally or alternatively, server 110 may also release one or more node devices by removing the executable file packages from the node devices, thereby returning them to full control by the previous owner (e.g., network service provide, cloud service provider, etc.). In this manner, server 110 may be able to dynamically configure and scale system 200 (e.g., the node devices, such as node devices 240 and 250) based on target parameters of data collection jobs or other criteria, without requiring the cybersecurity company to procure and deploy additional hardware or find additional service providers and provide software and training to add additional node devices.

Node devices 240 and 250 receive messaging (e.g., task schedule 280 or start command 282) from server 110 and perform associated data collection tasks indicated by the messaging. For example, first node device 240 may identify at least one data collection agent of the one or more data collection agents included in executable file package 248 to be executed to perform a data collection task assigned to first node device 240. Similarly, second node device 250 may identify at least one data collection agent of the one or more data collection agents included in executable file package 258 to be executed to perform a data collection task assigned to second node device 250. The node devices may identify the at least one data collection agent based on messaging (e.g., task schedule 280 or start command 282) received from server 110 indicating that data collection tasks are assigned to the node devices. For example, based on receiving either task schedule 280 or start command 282 indicating a data collection task assigned to first node device 240, first node device 240 may identify one or more data collection agents included in executable file package 248 that are associated with (e.g., that are capable of performing) the identified data collection task. To further illustrate, if task schedule 280 indicates that an IP mapping task is assigned to first node device 240 at a particular time, first node device 240 may identify an IP mapping agent (or multiple data collection agents that in conjunction perform IP mapping) from a plurality of data collection agents included in executable file package 248 for execution at the particular time. As another example, based on receiving start command 282 that indicates that a web crawling task is assigned to second node device 250, second node device may identify a web crawling agent from a plurality of data collection agents included in executable file package 258 for execution to perform the web crawling task. In some implementations, the messaging (e.g., task scheduled 280 or start command 282) may include additional information for use in executing data collection agents, such as one or more default parameters to be used, or a portion of parameters to be used in conjunction with others determined by the respective node devices, as further described herein.

After identifying the data collection agents that correspond to the assigned data collection tasks, node devices of system 100 select parameters for executing the identified data collection agents. For example, first node device 240 may select first parameter values 249 for use in executing at least one data collection agent. As another example, second node device 250 may select second parameter values 259 for use in executing at least one data collection agent. The selected parameter values may be values of parameters that adjust performance of the assigned data collection tasks. For example, first parameter values 249 and second parameter values 259 may correspond to values of one or more parameters that include a timing alignment parameter, a frequency parameter, metadata used to obtain cybersecurity data, or a combination thereof. The timing alignment parameter indicates alignment of timing between one or more packets communicated during performance of the respective data collection task. The frequency parameter indicates frequency of one or more packets communicated during performance of the respective data collection task. The metadata may include identifying information (e.g., user identifiers, IP addresses, device identifiers, application identifiers, or the like), message headers, other information, or a combination thereof, included in the packets, which in some implementations includes application-level data. If first node device 240 and second node device 250 identify the same data collection agent(s), first parameter values 249 and second parameter values 259 include values for the same quantity and types of parameters. Alternatively, if first node device 240 and second node device 250 identify different data collection agents, first parameter values 249 and second parameter values 259 may include values for different quantities or types of parameters.

The node devices select parameter values for use in executing data collection agents based on characteristics associated with the respective logical groups to which the node devices are assigned. For example, first node device 240 may select first parameter values 249 based on first characteristics of a first logical group that includes first node device 240, and second node device 250 may select second parameter values 259 based on second characteristics associated with a second logical group that includes second node device 250. The characteristics may include geographical locations, geopolitical locations, types of assigned data collection tasks, hardware characteristics, network access characteristics, network presence characteristics, application, software, or operating system characteristics, communication protocol characteristics, other characteristics, or a combination thereof, as non-limiting examples. Selection of parameter values based on characteristics of logical groups is explained in further detail herein with reference to FIG. 3. In some implementations, selecting the parameter values may include adjusting initial or default parameters received from server 110 based on characteristics of the logical group that includes the respective node devices. For example, first node device 240 may adjust or modify one or more default parameters received from server 110 based on characteristics of the first logical group, or based on difference(s) between the characteristics of the first logical group and characteristics of server 110, to generate first parameter values 249. In some other implementations, selecting the parameter values may include calculating or generating new set(s) of parameters unrelated to the default parameters received from server 110 (or there may not be default parameters received from server 110). For example, second node device 250 may calculate a set of parameter values for second parameter values 259 based on characteristics of the second logical group, regardless of any default parameters received from server 110. In both implementations, first parameter values 249 and second parameter values 259 include at least one different parameter value than any default or initial parameters provided by server 110 (which may correspond to default parameter values associated with a communication protocol used to communicate masked traffic). Selection of parameter values in this manner by node devices 240 and 250 enables masking of traffic, or other obfuscation of traffic, using one or more techniques or protocols for masking traffic that would otherwise be unsuccessful using default parameters. For example, the default parameters may not include all the parameter values required to support a traffic masking technique such as a proxy or a virtual private network, or use of the default parameters may be associated with a high likelihood that network target 262 would identify the masked traffic as part of data collection and therefore block the traffic or return improper information in response to scanning, mapping, or testing operations.

In some implementations, node devices send respective selected parameters to server 110, and server 110 aggregates the parameter values to generate group parameter values for the various logical groups. For example, first node device 240 may send first parameter values 249 to server 110, and server 110 generate a first set of group parameter values based on first parameter values 249 and other parameter values received from other node devices of the first logical group. The first set of group parameter values may be generated by aggregating, averaging, or otherwise combining the parameter values received from multiple node devices of the first logical group. After generating (e.g., determining) the first set of group parameter values, server 110 may send the first set of group parameter values to node devices of the first logical group, including first node device 240. In some such implementations, first node device 240, and other node devices of the first logical group, may use the first set of group parameters as first parameter values 249 when performing future data collection tasks. Similar operations may be performed for the other logical groups. Additionally, server 110 may use the group parameters determined for one logical group to determine group parameters for other logical groups, such as by adjusting the group parameters for the first logical group based on the characteristics of the second logical group, or the difference between the characteristics of the first logical group and the second logical group, to determine group parameters for the second logical group. In some implementations, the cybersecurity data sent by the node devices to server 110 may include data that indicates what parameters were used for each set of results, whether the node devices detected success or failure of the data collection tasks, or the like, and server 110 may use this information to learn patterns and to further improve group parameter values, using rule-based computations or artificial intelligence and/or machine learning models, as non-limiting examples.

After selecting parameter values and identifying data collection agents for execution, the node devices execute the identified data collection agents based on the selected parameter values to initiate communication of masked traffic to network target 262 to perform the assigned data collection tasks. Communication of masked traffic between the node devices and network target 262 enable the node devices to obtain respective cybersecurity data about the network target 262. For example, first node device 240 may execute at least one data collection agent included in executable file package 248 based on first parameter values 249 to initiate communication of first masked traffic 270 to network target 262 to obtain (e.g., receive and generate) first cybersecurity data 272 about network target 262. Similarly, second node device

250 may execute at least one data collection agent included in executable file package 258 based on second parameter values 259 to initiate communication of second masked traffic 274 to network target 262 to obtain (e.g., receive and generate) second cybersecurity data 276 about network target 262. Cybersecurity data obtained by node devices may indicate one or more cybersecurity attributes or status of network target 262. For example, first cybersecurity data 272 and/or second cybersecurity data 276 may include or indicate port mapping, DNS mapping, web page results, fingerprint data, script outputs, CVE vulnerability results, or the like, associated with network target 262, and any other network targets for which data collection tasks were performed.

Node devices 240 and 250 may mask traffic using one or more techniques or masking technologies to remove or obfuscate portions of traffic coming from node devices 240 and 250, or to otherwise modify the masked traffic such that it does not resemble conventional data collection traffic. For example, first node device 240 may mask an IP address of server 110 from one or more packets for transmission to network target 262 to generate first masked traffic 270. Additionally or alternatively, first node device 240 may mask or modify other portions of first masked traffic 270, such application identifiers, device identifiers, metadata, or the like. Masking traffic may also include changing parameters, such as timing alignment parameters, frequency parameters, or the like, of the traffic such that the traffic appears to be natural traffic from a user and not traffic from an automated data collection task. For example, first node device 240 may select first parameter values 249 such that timing of first masked traffic 270 resembles timing of user-generated traffic in the same geographical or geopolitical location, using the same hardware or devices, using similar network addresses or identification, using the same applications or communication protocols, or the like. Second node device 250 may perform similar operations in generation of second masked traffic 274. In some implementations, the node devices may implement certain traffic masking technology, such as proxies, virtual private networks (VPNs), or the like, to generate and communicate masked traffic to network target 262. As a non-limiting example, first node device 240 communicate first masked traffic 270 to network target 262 via a first VPN and second node device 250 may communicate second masked traffic 274 to network target 262 via a second VPN that is different than the first VPN. The difference in VPNs, proxies, or the like, may be due the different characteristics between the first logical group and the second logical group, for which the node devices select different parameter values (e.g., first parameter values 249 and second parameter values 259). Executing the data collection agents with the selected parameters may cause the node devices to interact with the proxies, VPNs, or the like, using a modified network stack that enables performance of data collection tasks, such as internet scanning, via the proxies, VPNs, or the like, which are configured to expect more typical user traffic patterns and network stacks as inputs and outputs.

In some implementations, the node devices compare obtained cybersecurity data to one or more criteria to determine whether network target 262 blocked data collection or otherwise returned improper or unexpected data. In such implementations, if the node devices determine that the data collection was blocked or received improper data, the node devices dynamically update the respective selected parameters to continue the respective data collection task. For example, first node device 240 may compare at least a portion of first cybersecurity data 272 to one or more criteria, and if the portion of first cybersecurity data 272 fails to satisfy the one or more criteria, first node device 240 may dynamically update first parameter values 249. To illustrate, if first masked traffic 270 corresponds to performance of an IP port scan for a plurality of ports at network target 262 and all ports are indicated as open, or the results are null or random values instead of an indication of open ports, then first node device 240 may determine that the IP port scan was unsuccessful. Based on a determination that the data collection task was unsuccessful, first node device 240 may modify one or more of first parameter values 249. For example, first node device 240 may decrease the frequency (e.g., increase the amount of time) between scanning of different ports to more closely correspond to typical user traffic that includes scanning to determine if a particular port is open for performing a user-specified operation. Alternatively, if the frequency between scanning different ports is very low, first node device 240 may modify first parameter values 249 to increase the frequency to more closely resemble typical user traffic. As another example, first node device 240 may reduce or increase a timing alignment parameter value of first parameter values 249 to more closely resemble timing alignment between typical user traffic, or first node device 240 may modify metadata provided in first masked traffic 270 to attempt to successfully perform the data collection operation. Additionally or alternatively, the node devices may terminate data collection operations that are determined to be unsuccessful or blocked. For example, first node device 240 may compare at least a portion of first cybersecurity data 272 to one or more criteria, and if the portion of first cybersecurity data 272 fails to satisfy the one or more criteria, first node device 240 may terminate communication of first masked traffic 270 to network target 262. Similar to discussed above, the criteria may include failing to receive a response from network target 262, receiving improper or random results from network target 262 based on particular data collection tasks, etc. In some implementations, the node devices may adjust the respective parameter values upon detection of an unsuccessful data collection task, and if the data collection task continues to be unsuccessful for a threshold number of times, or for a threshold time period, the node devices may terminate the data collection task with respect to network target 262. Terminating the data collection task may include terminating data collection from all network targets or proceeding to a next network target (if any remain in performance of the data collection task).

In some implementations, the node devices modify or update respective selected parameter values used to execute data collection agents during performance of data collection tasks based on changes to characteristics of the logical groups. For example, if the logical groups are based on geographic regions and a known cyberattack is detected in a geographic region that corresponds to the first logical group, first node device 240 may modify first parameter values 249 based on changes to the first set of characteristics that correspond to the first logical group, such as by adjusting a timing alignment parameter or a frequency parameter such that first masked traffic 270 does not share timing characteristics with the detected cyberattack. As another example, if the logical groups are based on hardware or applications used to access the Internet and an application associated with the second logical group is updated to change metadata used in communications by the application, second node device 250 may modify second parameter values 259 to include the change in metadata. The changes to the characteristics may be indicated by server 110, may be detected by the node devices, or may be communicated or determined from other source(s). The node devices may modify the parameter values to reflect the changes in the characteristics of the logical groups to which they belong. In some implementations, the node devices modify the respective selected parameter values during performance of data collection tasks (e.g., as the characteristic changes are received or detected). In some other implementations, the node devices wait until completion of a current data collection task to modify the parameter values, such as between data collection tasks or prior to (or during) operation in a low power or idle mode by the node devices. In some implementations, the executable file packages (e.g., executable file packages 248 and 258) include instructions or routine to cause the node devices (e.g., node devices 240 and 250, respectively) to monitor the characteristics of their respective logical groups for changes and to modify the selected parameter values (e.g., first parameter values 249 and second parameter values 259, respectively) accordingly. In some other implementations, server 110 monitors the characteristics of the logical groups and provides instructions to node devices of a logical group to modify parameter values when characteristics of the logical group change.

After communicating masked traffic to network target 262 and obtaining cybersecurity data, the node devices send the respective cybersecurity data to server 110. For example, first node device 240 may send first cybersecurity data 272 to server 110 and second node device 250 may send second cybersecurity data 276 to server 110. Node devices 240 and 250 may be configured to provide the respective cybersecurity data to server 110 as streaming data, to periodically transmit the respective cybersecurity data (e.g., based on buffering a particular amount, based on predetermined time and/or frequency settings, based on congestion of communication network 260, etc.), to transmit the respective cybersecurity data according to a schedule, to store the respective cybersecurity data in a database or other storage location, or any other technique for providing or making accessible the respective cybersecurity data to server 110. In some implementations, node devices 240 and 250 may send cybersecurity data 272 and 276, respectively, to server 110 according to task schedule 280. In some other implementations, node devices 240 and 250 may send cybersecurity data 272 and 276, respectively, to server 110 as soon as the data is received (e.g., either based on start command 282 or a preset configuration to provide cybersecurity data as it is obtained or after buffering a threshold amount). Server 110 receives cybersecurity data from the node devices and provides the received cybersecurity data to cybersecurity risk analyzer 228 to perform one or more cybersecurity operations that generate processed cybersecurity data 234. For example, server 110 may provide first cybersecurity data 272 and second cybersecurity data 276 to cybersecurity risk analyzer 228 to cause generation of a cybersecurity risk score for an enterprise, which may include or correspond to processed cybersecurity data 234. Examples of cybersecurity operations performed by server 110 (e.g., by cybersecurity risk analyzer 228) include generating or determining cybersecurity risk scores, cybersecurity risk benchmarks, cybersecurity ratings, cybersecurity attack information, cybersecurity risk information, IP addresses and/or mappings, IP port mappings, fingerprint data, scanning script outputs, CVE information, other operations, or a combination thereof. Processed cybersecurity data 234 (e.g., cybersecurity risk scores, port mappings, DNS mappings, web crawler results, threat analytics, CVE vulnerability results, etc.) can be provided to and displayed at user devices (e.g., user station 160), or can be by server 110 used to trigger other actions. For example, server 110 may generate an instruction for a network device of an entity to change router settings, to require stronger passwords for users, to reconfigure network settings, or the like, based on processed cybersecurity data 234.

Although the configuration of system 200 illustrated in FIG. 2 is a centralized configuration (e.g., with server 110 acting as a central control hub), in some other implementations, system 200 may be completely decentralized. For example, each logical group of node devices may include a manager device, such as a server, a desktop computer, a laptop computer, a mobile device, or the like, to control and manage operations of the node devices of that logical group and to receive and process the cybersecurity data. For example, first node device 240 may receive control signals from and send first cybersecurity data 272 to a first group-specific device included in the first logical group, and second node device 250 may receive control signals from and send second cybersecurity data 276 to a second group-specific device included in the second logical group. Alternatively, each node device may be configured to act independently (e.g., without any management by a server or other device), and node devices of logical groups may share information between each other, such as selected parameters, to perform some of the operations described above. In some such implementations, the node devices may each individually process and perform cybersecurity operations based on their respective cybersecurity data, or the node devices may provide the cybersecurity data to a shared storage location, such as a network database or the like, for use by other devices. As such, operations and benefits described above may also be extended to a partially or entirely decentralized network deployment in some other implementations.

In a particular implementation, a system (e.g., 200) for distributed cybersecurity data collection and traffic masking is disclosed. The system includes a first node device (e.g., 240) assigned to a first logical group of node devices that is associated with a first set of characteristics. The first node device includes a first memory (e.g., 246) storing a first executable file package (e.g., 248). The first executable file package includes one or more data collection agents. The first node device also includes a first processor (e.g., 242) coupled to the first memory. The first processor is configured to execute at least one data collection agent of the one or more data collection agents based on first parameter values (e.g., 249) to initiate communication of first masked traffic (e.g., 270) to a network target (e.g., 262) to obtain first cybersecurity data (e.g., 272) about the network target. The first parameter values are selected based on the first set of characteristics. The system also includes a second node device (e.g., 250) assigned to a second logical group of node devices that is associated with a second set of characteristics. The second node device includes a second memory (e.g., 256) storing a second executable file package (e.g., 248). The second executable file package includes the one or more data collection agents. The second node device also includes a second processor (e.g., 252) coupled to the second memory. The second processor is configured to execute at least one data collection agent of the one or more data collection agents based on second parameter values (e.g., 259) to initiate communication of second masked traffic (e.g., 274) to the network target to obtain second cybersecurity data (e.g., 276) about the network target. The second parameter values are selected based on the second set of characteristics. The system further includes a server (e.g., 110) communicatively coupled to the first node device and the second node device. The server includes a third memory (e.g., 230) and a third processor (e.g., 220) coupled to the third memory. The third processor is configured to receive the first cybersecurity data from the first node device and to receive the second cybersecurity data from the second node device.

In another particular implementation, a computer program product that includes a computer-readable storage device, such as a non-transitory computer-readable storage medium, is described. The computer-readable storage device includes instructions which, when executed by one or more processors (e.g., 242), cause the one or more processors to perform operations for distributed cybersecurity data collection and traffic masking. The operations include receiving, by a first node device (e.g., 240) assigned to a first logical group of node devices that is associated with a first set of characteristics, an executable file package (e.g., 248) including one or more data collection agents. The operations also include identifying at least one data collection agent of the one or more data collection agents to be executed to perform a data collection task. The operations include executing the at least one data collection agent based on first parameter values (e.g., 249) to initiate communication of masked traffic (e.g., 270) to a network target (e.g., 262) to obtain cybersecurity data (e.g., 272) about the network target. The first parameter values are selected based on the first set of characteristics. The operations further include transmitting the cybersecurity data to a server (e.g., 110).

As described above, system 200 provides a system for distributed cybersecurity data collection and traffic masking. This can be advantageous in a number of scenarios. For example, server 110 and node devices 240 and 250 can be utilized to perform data collection from different locations or using different applications or network access situations in order to provide a global or otherwise multi-region or multi-group view of cybersecurity posture of network target 262. To further illustrate, first node device 240 and other devices of the first logical group may be located in a first geographic or geopolitical location, or may use first applications or hardware, or the like, and second node device 250 and other devices of the second logical group may be located in a second geographic or geopolitical location, or may use second applications or hardware, or the like. Because first node device 240 and second node device 250 select respective parameter values based on the characteristics of their logical groups, the cybersecurity data obtained by node devices 240 and 250 represents the different perspectives of the network (e.g., the Internet) of node devices 240 and 250. This larger view may match those of hackers or other malicious actors, who may be located in other locations or use other technology than used by server 110 (or cloud service providers accessible to server 110). Additionally, because node devices 240 and 250 mask the data collection task traffic, based on parameter values 249 and 259, respective, network target 262 may not identify server 110 as an originator of masked traffic 270 and 274 and that masked traffic 270 and 274 is part of data collection (e.g., scanning), as opposed to typical user traffic. For this reason, network target 262, or a firewall or other security protocols, may be less likely to block masked traffic 270 and 274 or provide improper responses. Thus, system 200 described above provides a distributed, modular cybersecurity data collection system capable of viewing network(s) (e.g., the Internet) from multiple perspectives without requiring significant management by a network administrator or time and costs to deploy and scale.

Figure 3:
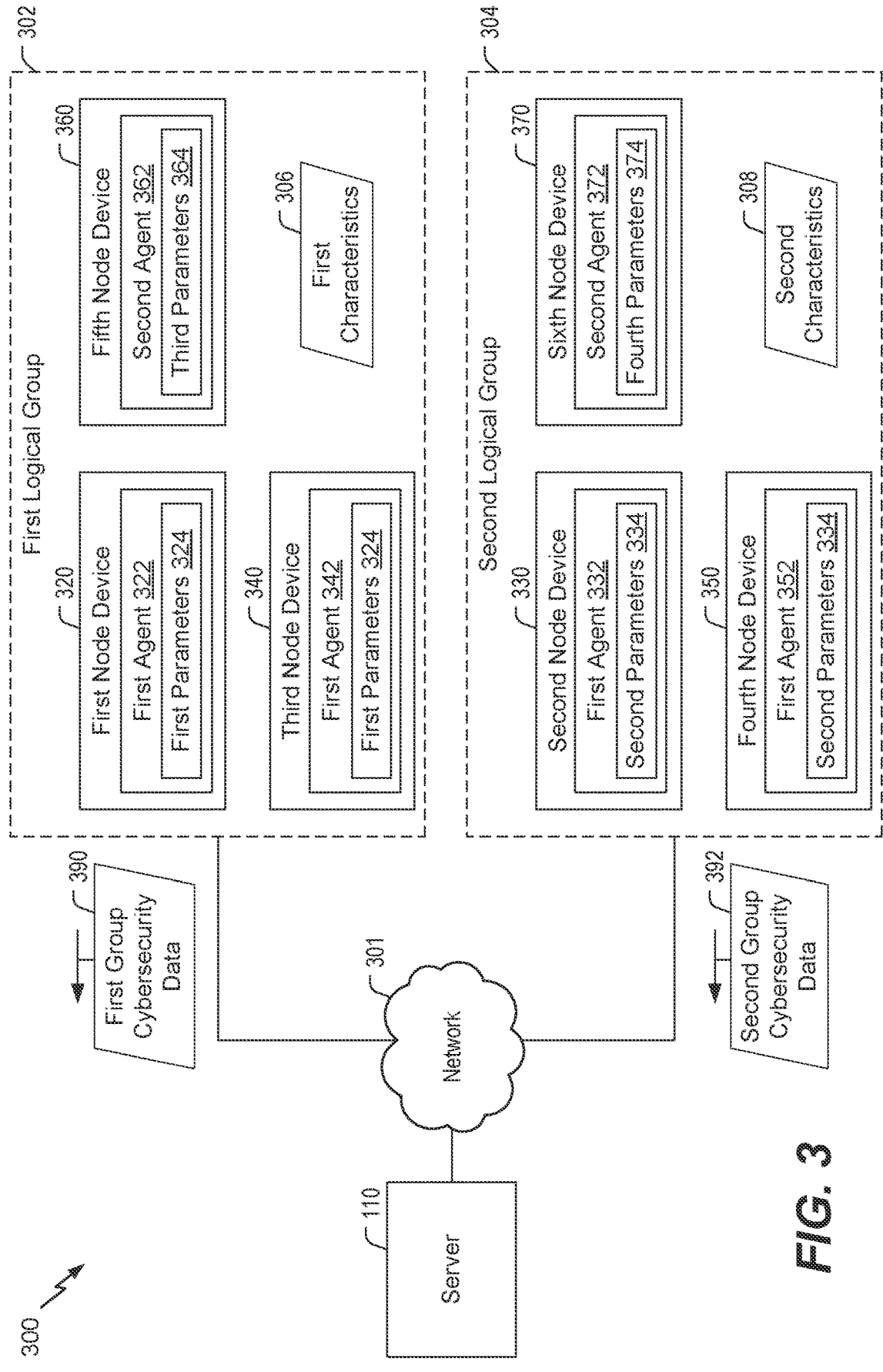
FIG. 3 is a block diagram of another example of a system for distributed cybersecurity data collection and traffic masking according to one or more aspects.

Referring to FIG. 3, a block diagram of another example of a system (e.g., a distributed system) for distributed cybersecurity data collection and traffic masking according to one or more aspects is shown as a system 300. In an implementation shown in FIG. 3, the system 300 includes a server 110, a first node device 320, a second node device 330, a third node device 340, a fourth node device 350, a fifth node device 360, a sixth node device 370, and a communication network 301. In some implementations, system 300 (or a portion thereof) may include or correspond to system 100 of FIG. 1 or system 200 of FIG. 2 (or portions thereof). For example, server 110 of FIG. 3 may include or correspond to server 110 of FIGS. 1-2, communication network 301 may include or correspond to communication network 120 of FIG. 1 or communication network 260 of FIG. 2, and node devices 320, 330, 340, 350, 360, and 370 may include or correspond to node devices 180 of FIG. 1 or node devices 240 and 250 of FIG. 2, as non-limiting examples.

The node devices 320, 330, 340, 350, 360, and 370 are assigned to different logical groups of node devices. For example, a first logical group 302 includes first node device 320, third node device 340, and fifth node device 360, and a second logical group 304 includes second node device 330, fourth node device 350, and sixth node device 370. Node devices may be assigned to the logical groups based on one or more grouping criteria that are relevant to performance of data collection tasks, or the results thereof. For example, first logical group 302 and second logical group 304 may correspond to geographic locations, different geopolitical locations (e.g., countries, states, provinces, cities, counties, towns, governmental regions, or the like), different assigned data collection tasks, different relationships to particular entities, different types of supported devices, hardware, or applications, different communication protocols, other differences, or a combination thereof. Each logical group corresponds to different characteristics associated with node devices assigned to the respective logical group. For example, first logical group 302 is associated with first characteristics 306, and second logical group 304 is associated with second characteristics 308. The characteristics (e.g., first characteristics 306 and second characteristics 308) may include or correspond to any characteristic that relates or corresponds to the above-mentioned examples of grouping criteria.

During operation of the system 300, the node devices may identify and execute data collection agents included in executable file packages based on information from server 110, such as task schedules or on-demand commands, as described above with reference to FIG. 2. For example, first node device 320 may execute first agent 322, second node device 330 may execute first agent 332 (e.g., an instance of first agent 322 at second node device 330), third node device 340 may execute first agent 342 (e.g., an instance of first agent 322 at third node device 340), fourth node device 350 may execute first agent 352 (e.g., an instance of first agent 322 at fourth node device 350), fifth node device 360 may execute second agent 362, and sixth node device 370 may execute second agent 372 (e.g., an instance of second agent 362 at sixth node device 370). Each node device may execute the respective data collection agent based on parameter values that are selected based on the data collection task assigned for performance (e.g., the data collection task associated with the respective data collection agent) and based on characteristics associated with the respective logical group to which the node device is assigned. For example, first node device 320 and third node device 340 may execute first agent 322 and first agent 342, respectively, based on first parameters 324 that are selected based on the data collection task associated with the first agent and first characteristics 306. As another example, second node device 330 and fourth node device 350 may execute first agent 332 and first agent 352, respectively, based on second parameters 334 that are selected based on the data collection task associated with the first agent and second characteristics 308. As another example, fifth node device 360 may execute second agent 362 based on third parameters 364 that are selected based on the data collection task associated with the second agent and first characteristics 306. As yet another example, sixth node device 370 may execute second agent 372 based on fourth parameters 374 that are selected based on the data collection task associated with the second agent and second charac- teristics 308. After executing the respective data collection agents and obtaining respective cybersecurity data, the node devices send the cybersecurity data to server 110 for pro- cessing. In the example shown in FIG. 3, node devices of first logical group 302 send first group cybersecurity data 390 to server 110 and node devices of second logical group 304 send second group cybersecurity data 392 to server 110. Although shown as one data element for each logical group, this is for ease of illustration, and it is contemplated that node devices of a logical group may send their respective cybersecurity data to server 110 at the same or different times than other node devices of the same logical group.

In some implementations, node devices in different logi- cal groups that execute the same data collection agent use the same set of parameters, but one or more differing values for those parameters based on differences between the characteristics of the different logical groups. To illustrate, in the example shown in FIG. 3, first parameters 324 include values for the same types of parameters as second param- eters 334, but one or more of the values may be different between first parameters 324 and second parameters 334 based on differences between first characteristics 306 and second characteristics 308. Similarly, third parameters 364 include values for the same types of parameters as fourth parameters 374, but one or more of the values may be different between third parameters 364 and fourth param- eters 374 based on differences between first characteristics 306 and second characteristics 308. To further illustrate, first parameters 324 may include values of one or more different types of parameters than are included in third parameters 364, even though the respective node devices are all included in first logical group 302, due to differences between the data collection agents (e.g., first agent 322/first agent 342 and second agent 362) being executed by the node devices. Similarly, second parameters 334 may include values of one or more different types of parameters than are included in fourth parameters 374 due to differences between first agent 332/first agent 352 and second agent 372. In some other implementations, different data collection agents may use a single common set of parameters. In such implementations, all parameter values based on first char- acteristics 306 (e.g., first parameters 324 and third param- eters 364) are the same, and all parameter values based on second characteristics 308 (e.g., second parameters 334 and fourth parameters 374) are the same.

In some implementations, node devices may be config- ured to perform multiple different data collection tasks, either serially or concurrently. To illustrate, a task schedule may indicate that a particular node device is scheduled to perform a first data collection task at a first time and a second data collection task at a second time, and the particular node device may execute different data collection agents at the different times to perform the different data collection tasks. For example, after executing first agent 322 based on first parameters 324 to perform a first data collection task, first node device 320 may identify a second data collection agent (e.g., included in an executable file package stored at first node device 320) to be executed to perform a second data collection task. First node device 320 may execute the second data collection agent (e.g., an instance of second agent 362 at first node device 320) based on second param- eter values to initiate communication of second masked traffic to one or more network targets, which may result in first node device 320 obtaining additional cybersecurity data. In this example, first node device 320 selects the second parameter values based on first characteristics 306 and the second data collection task. TO further illustrate, in this example, first node device 320 may execute first agent 322 based on first parameters 324 and, after obtaining first cybersecurity data and sending the first cybersecurity data to server 110, first node device 320 may execute an instance of second agent 362 based on third parameters 364 to obtain additional cybersecurity data, which is then sent to server 110. Although the example above has been described based on scheduling different data collection tasks at different times, the node devices may similarly identify and execute a different data collection agent than is currently being executed based on receipt of an on-demand command from server 110, thereby enabling node devices to perform on- demand data collection in real-time (or near real-time).

In some implementations, system 200 of FIG. 2 and system 300 of FIG. 3 (e.g., server 110) are configured to operate as a centerpiece of a signal intelligence collection system. The data collection agents in the executable file packages distributed to node devices may enable perfor- mance of quick scans of large portions of the Internet (e.g., a masscan quick scan of an entire IPv4 range) followed by a more detailed scan (e.g., a deep network mapper (nmap) scan). Because the data collection tasks are performed by node devices in different geographic or geopolitical loca- tions or with different presence or access to the Internet (or other different characteristics), the resultant cybersecurity data obtained from the node devices may provide visibility to the data a cyber attacker sees in the different locations or from the different Internet presence or access, such as port mappings, fingerprinting, nmap script output, CVE vulner- ability checks, and the like. The data collection tasks may be performed faster than with other data collection systems, such as a one week cadence for entire IPv4 deep scans (e.g., nmap scans) across 1400 or more ports and a five day cadence for the quick scan (e.g., masscan). The data collec- tion scripts may include default and custom scripts that correspond to multiple different data collection categories, with the ability to efficiently add more to support a fully customizable data collection system across many or all aspects on a large (e.g., global or near-global) scale. The data collection agents and scripts may be configured based on type of data collection, IP ranges, locations, and other criteria to enable distributed scanning over a large area with region-specific data collection configurations (or based on other criteria). Each node device may use proxies, VPNs, or the like, to mask traffic and thereby improve the likelihood of success of the data collection without requiring detailed knowledge of a network administrator to program and oversee each node device.

FIGS. 4-5 are flow diagrams of examples of methods of distributed cybersecurity data collection and traffic masking. For example, the methods of FIGS. 4-5 may enable perfor- mance of one or more data collection tasks by components of a distributed system that mask the traffic communicated during performance of the data collection task(s). In some implementations, the methods of FIGS. 4-5 may also enable determination of a cybersecurity risk level based on results of the data collection task(s). Each of the methods of FIGS. 4-5 may be stored in a computer-readable storage medium as instructions that, when executed by one or more processors, cause the one or more processors to perform the operations of the method (e.g., 400 and/or 500). In an embodiment, the methods of FIGS. 4-5 may be performed by server 110 (e.g., processor 220) of FIGS. 1-3, by node devices 180 of FIG. 1, first node device 240 and/or second node device 250 (e.g., processors 242 and/or 252) of FIG. 2, one or more of node devices 320, 330, 340, 350, 360, and 370 of FIG. 3, or a combination thereof.

Referring to FIG. 4, a flow diagram of an example of a method for distributed cybersecurity data collection and traffic masking according to one or more aspects is shown as a method 400. At 402, method 400 includes deploying executable file packages including data collection agents to logical groups of node devices. For example, the executable file packages may include or correspond to executable file package 248 or executable file package 258 of FIG. 2. At 404, method 400 includes providing, by a server to the logical groups of node devices, a data collection task schedule or an on-demand start command. For example, the data collection task schedule may include or correspond to task schedule 280 of FIG. 2, and the on-demand start command may include or correspond to start command 282 of FIG. 2.

At 406, method 400 includes executing at least one data collection agent at one or more node devices of a first logical group based on first parameter values to communicate first masked traffic to a network target to obtain first cybersecurity data. For example, the one or more node devices of the first logical group may include or correspond to first node device 240 of FIG. 2, first parameter values may include or correspond to first parameter values 249 of FIG. 2, the first masked traffic may include or correspond to first masked traffic 270 of FIG. 2, the network target may include or correspond to network target 262 of FIG. 2, and the first cybersecurity data may include or correspond to first cybersecurity data 272 of FIG. 2. At 408, method 400 includes sending the first cybersecurity data from the one or more node devices of the first logical group to the server. To illustrate, first node device 240 of FIG. 2 may send first cybersecurity data 272 to server 110.

At 410, method 400 includes executing at least one data collection agent at one or more node devices of a second logical group based on second parameter values to communicate second masked traffic to the network target to obtain second cybersecurity data. For example, the one or more node devices of the second logical group may include or correspond to second node device 250 of FIG. 2, the second parameter values may include or correspond to second parameter values 259 of FIG. 2, the second masked traffic may include or correspond to second masked traffic 274 of FIG. 2, and the second cybersecurity data may include or correspond to second cybersecurity data 276 of FIG. 2. In some implementations, the first parameter values and the second parameter values correspond to one or more parameters that include a timing alignment parameter, a frequency parameter, metadata used to obtain cybersecurity data, or a combination thereof, as further described with reference to FIG. 2. At 412, method 400 includes sending the second cybersecurity data from the one or more node devices of the second logical group to the server. To illustrate, second node device 250 of FIG. 2 may send second cybersecurity data 276 to server 110.

At 412, method 400 includes performing, at the server, one or more cybersecurity risk analysis operations based on the first cybersecurity data and the second cybersecurity data. To illustrate, server 110 of FIG. 2 may process the received cybersecurity data (e.g., first cybersecurity data 272 and second cybersecurity data 276) to generate processed cybersecurity data 234, or server 110 may provide the received cybersecurity data as input to cybersecurity risk analyzer 228 to generate processed cybersecurity data 234 by performing one or more cybersecurity risk analysis operations.

In some implementations, the first logical group of node devices includes one or more node devices located within a first geographic or geopolitical region, and the second logical group of node devices includes one or more node devices located within a second geographic or geopolitical region that is different than the first geographic or geopolitical region. In some other implementations, the first logical group of node devices includes one or more node devices assigned to perform a first data collection task, and the second logical group of node devices includes one or more node devices located assigned to perform a second data collection task that is different than the first data collection task. Additionally or alternatively, the first data collection task and the second data collection task may include IP port scanning, DNS scanning, or web crawling.

In some implementations, method 400 also includes providing, by the server, the task schedule to the first node device and the second device, initiating, by the first node device, execution of the at least one data collection agent and transmission of the first cybersecurity data to the server according to the task schedule, and initiating, by the second node device, execution of the at least one data collection agent and transmission of the second cybersecurity data to the server according to the task schedule. To illustrate, server 110 of FIG. 2 may send task schedule 280 to node devices 240 and 250, first node device 240 may execute at least one data collection agent in executable file package 248 and transmit first cybersecurity data 272 to server 110 according to task schedule 280, and second node device 250 may execute at least one data collection agent in executable file package 258 and transmit second cybersecurity data 276 to server 110 according to task schedule 280. In some other implementations, method 400 also includes providing, by the server, the on-demand start command to the first node device and the second node device, initiating, by the first node device, execution of the at least one data collection agent based on receipt of the on-demand start command, and initiating, by the second node device, execution of the at least one data collection agent based on receipt of the on-demand start command. To illustrate, server 110 of FIG. 2 may send start command 282 to node devices 240 and 250, first node device 240 may execute at least one data collection agent in executable file package 248 based on receipt of start command 282, and second node device 250 may execute at least one data collection agent in executable file package 258 based on receipt of start command 282.

In some implementations, method 400 further includes generating, by the server, a cybersecurity risk score for an enterprise based on the first cybersecurity data and the second cybersecurity data. To illustrate, server 110 of FIG. 2 may provide first cybersecurity data 272 and second cybersecurity data 276 as input to cybersecurity risk analyzer 228 to generate a cybersecurity risk score for an enterprise. Additionally or alternatively, method 400 may also include communicating, by the first node device, the first masked traffic to the network target via a first VPN and communicating, by the second node device, the second masked traffic to the network target via a second VPN that is different than the first VPN. To illustrate, first node device 240 of FIG. 2 may establish a first VPN to communicate first masked traffic 270 with network target 262, and second node device 250 of FIG. 2 may establish a second VPN that is different than the first VPN to communicate second masked traffic 274 with network target 262.

In some implementations, method 400 also includes transmitting, by the first node device, the first parameter values to the server, generating, by the server, a first set of group parameter values based on the first parameter values and other parameter values received from other node devices of the first logical group, and transmitting, by the server, the first set of group parameter values to the first logical group. To illustrate, first node device 240 of FIG. 2 may transmit first parameter values 249 to server 110, and server 110 may generate a first set of group parameter values based on first parameter values 249 and other parameter values from node devices of the same logical group as first node device 240. After generating the first set of group parameters, server 110 may send the first set of group parameters to the node devices of the first logical group, including first node device 240, for use by the node devices for performing data collection tasks.

Referring to FIG. 5, a flow diagram of an example of a method for distributed cybersecurity data collection and traffic masking according to one or more aspects is shown as a method 500. At 502, method 500 includes receiving, by a first node device assigned to a first logical group of node devices that is associated with a first set of characteristics, an executable file package including one or more data collection agents. For example, the first node device may include or correspond to first node device 240 of FIG. 2, and the executable file package may include or correspond to executable file package 248 of FIG. 2. At 504, method 500 includes identifying, by the first node device, at least one data collection agent of the one or more data collection agents to be executed to perform a data collection task. To illustrate, first node device 240 of FIG. 2 may identify at least one data collection agent included in executable file package 248, such as based on task schedule 280 or start command 282, as non-limiting examples, that indicate one or more data collection tasks corresponding to the at least one data collection agent.

At 506, method 500 includes executing, by the first node device, the at least one data collection agent based on first parameter values to initiate communication of masked traffic to a network target to obtain cybersecurity data about the network target. The first parameter values are selected based on the first set of characteristics. To illustrate, the first parameter values may include or correspond to first parameter values 249 of FIG. 2, the masked traffic may include or correspond to first masked traffic 270 of FIG. 2, and the cybersecurity data may include or correspond to first cybersecurity data 272 of FIG. 2. The first parameter values may be selected based on a first set of characteristics associated with a logical group that includes the first node device, such as first characteristics 380 of FIG. 3. In some implementations, the first parameter values are different than default parameter values associated with a communication protocol used to communicate the masked traffic. Additionally or alternatively, the first parameter values may correspond to a timing alignment parameter, a frequency parameter, metadata used to obtain cybersecurity data, or a combination thereof. At 508, method 500 includes transmitting, by the first node device, the cybersecurity data to a server. To illustrate, first node device 240 of FIG. 2 may transmit first cybersecurity data 272 to server 110.

In some implementations, method 500 also includes comparing at least a portion of the cybersecurity data to one or more criteria and, based on the at least a portion of the cybersecurity data failing to satisfy the one or more criteria, dynamically updating the first parameter values based on the cybersecurity data. To illustrate, first node device 240 of FIG. 2 may dynamically update first parameter values 249 based on responses from network target 262 indicating that network target 262 is blocking or otherwise returning improper data based on performance of the data collection task. Additionally or alternatively, method 500 may further includes masking an IP address of the server from one or more packets for transmission to the network target to generate the masked traffic. For example, first masked traffic 270 of FIG. 2 may have the IP address of server 110 masked by first node device 240 when generating first masked traffic 270.

In some implementations, method 500 also includes modifying the first parameter values based on changes to the first set of characteristics. To illustrate, first node device 320 of FIG. 3 may modify first parameters 324 based on changes to first characteristics 380. Additionally or alternatively, method 500 may further include identifying a second data collection agent of the one or more data collection agents to be executed to perform a second data collection task and executing the second data collection agent based on second parameter values to initiate communication of second masked traffic to a second network target to obtain additional cybersecurity data about the network target. The second parameter values may be selected based on the first set of characteristics and the second data collection task. To illustrate, fifth node device 360 of FIG. 3 may identify second agent 362 and execute second agent 362 based on third parameters 364 that are selected based on first characteristics 380 and the data collection task that corresponds to second agent 362. Additionally or alternatively, method 500 may also include comparing at least a portion of the cybersecurity data to one or more criteria and, based on the at least a portion of the cybersecurity data failing to satisfy the one or more criteria, terminating communication of the masked traffic to the network target. To illustrate, first node device 240 may terminate communication of first masked traffic 270 to network target 262 based on responses from network target 262 indicating that network target 262 is blocking or otherwise returning improper data based on performance of the data collection task.

In some implementations, methods 400 and 500 can be combined such that one or more operations described with reference to one of the methods of FIGS. 4 and 5 and one or more operations described above with reference to the methods of FIGS. 5 and 4. For example, one or more operations of method 400 of FIG. 4 may be combined with one or more operations of method 500 of FIG. 5. Additionally, or alternatively, one or more operations described above with reference to method 500 of FIG. 5 may be combined with one or more operations of method 400 of FIG. 4.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for distributed cybersecurity data collection and traffic masking, the system comprising:
   a first node device assigned to a first logical group of node devices that is associated with a first set of characteristics, the first node device comprising:
      a first memory storing a first executable file package, the first executable file package including one or more data collection agents; and
      a first processor coupled to the first memory, the first processor configured to execute at least one data collection agent of the one or more data collection agents based on first parameter values to initiate communication of first masked traffic to a network target to obtain first cybersecurity data about the network target, the first parameter values selected based on the first set of characteristics;
   a second node device assigned to a second logical group of node devices that is associated with a second set of characteristics, the second node device comprising:
      a second memory storing a second executable file package, the second executable file package including the one or more data collection agents; and
      a second processor coupled to the second memory, the second processor configured to execute at least one data collection agent of the one or more data collection agents based on second parameter values to initiate communication of second masked traffic to the network target to obtain second cybersecurity data about the network target, the second parameter values selected based on the second set of characteristics;
   a server communicatively coupled to the first node device and the second node device, the server comprising:
a third memory; and
      a third processor coupled to the third memory, the third processor configured to receive the first cybersecurity data from the first node device and to receive the second cybersecurity data from the second node device, wherein the server determines a plurality of different logical groups of node devices, and wherein the server determines which node devices to assign to particular logical groups and particular data collection tasks;
wherein the system processes the cybersecurity data to determine at least one of data collection was blocked or improper data was received, wherein determining the at least one of data collection was blocked or improper data was received comprises: comparing the cybersecurity data to one or more criteria and based on the at least a portion of the cybersecurity data failing to satisfy the one or more criteria, terminating communication of the masked traffic to the network target; and
wherein the system, in response to determining at least one of the data collection was blocked or the improper data was received, dynamically adjusts the first parameter values to continue a respective data collection task, wherein adjusting comprises changing at least one of a frequency between scans or a timing alignment parameter value.

2. The system of claim 1, wherein the first parameter values and the second parameter values correspond to one or more parameters that include a timing alignment parameter, a frequency parameter, metadata used to obtain cybersecurity data, or a combination thereof.

3. The system of claim 1, wherein the first logical group of node devices comprises one or more node devices located within a first geographic or geopolitical region, and wherein the second logical group of node devices comprises one or more node devices located within a second geographic or geopolitical region that is different than the first geographic or geopolitical region.

4. The system of claim 1, wherein the first logical group of node devices comprises one or more node devices assigned to perform a first data collection task, and wherein the second logical group of node devices comprises one or more node devices assigned to perform a second data collection task that is different than the first data collection task.

5. The system of claim 4, wherein the first data collection task and the second data collection task comprise internet protocol (IP) port scanning, domain name system (DNS) scanning, or web crawling.

6. The system of claim 1, wherein:
   the third processor is further configured to provide a task schedule to the first node device and the second node device;
   the first processor is further configured to initiate execution of the at least one data collection agent and initiate transmission of the first cybersecurity data to the server according to the task schedule; and
   the second processor is further configured to initiate execution of the at least one data collection agent and initiate transmission of the second cybersecurity data to the server according to the task schedule.

7. The system of claim 1, wherein:
   the third processor is further configured to provide an on-demand start command to the first node device and the second node device;
   the first processor is further configured to initiate execution of the at least one data collection agent based on receipt of the on-demand start command; and
   the second processor is further configured to initiate execution of the at least one data collection agent based on receipt of the on-demand start command.

8. The system of claim 1, wherein the third processor is further configured to generate a cybersecurity risk score for an enterprise based on the first cybersecurity data and the second cybersecurity data.

9. The system of claim 1, wherein the first node device, comprising the first memory and the first processor, communicates the first masked traffic to the network target via a first virtual private network (VPN), and wherein the second node device, comprising the second memory and the second processor, communicates the second masked traffic to the network target via a second VPN that is different than the first VPN.

10. The system of claim 1, wherein:

the first processor is configured to initiate transmission of the first parameter values to the server;

the third processor is configured to generate a first set of group parameter values based on the first parameter values and other parameter values received from other node devices of the first logical group; and the third processor is configured to initiate transmission of the first set of group parameter values to the first logical group.

11. A method for distributed cybersecurity data collection and traffic masking, the method comprising:

determining, with a server of a distributed, modular cybersecurity data collection system, a plurality of different node devices of a plurality of different logical groups to perform a plurality of different respective data collections tasks;

managing, by the server of the distributed, modular cybersecurity data collection system, the plurality of different node devices of the plurality of different logical groups, wherein managing the plurality of different node devices comprises:

receiving, by a first node device assigned to a first logical group of node devices that is associated with a first set of characteristics, an executable file package including one or more data collection agents;

identifying, by the first node device, at least one data collection agent of the one or more data collection agents to be executed to perform a data collection task;

executing, by the first node device, the at least one data collection agent based on first parameter values to initiate communication of masked traffic to a network target to obtain cybersecurity data about the network target, the first parameter values selected based on the first set of characteristics;

transmitting, by the first node device, the cybersecurity data to the server;

processing the cybersecurity data to determine at least one of data collection was blocked or improper data was received, wherein determining the at least one of data collection was blocked or improper data was received comprises: comparing the cybersecurity data to one or more criteria and based on the at least a portion of the cybersecurity data failing to satisfy the one or more criteria, terminating communication of the masked traffic to the network target; and in response to determining at least one of the data collection was blocked or the improper data was received, dynamically adjusting the first parameter values to continue a respective data collection task, wherein adjusting comprises changing at least one of a frequency between scans or a timing alignment parameter value.

12. The method of claim 11, wherein the at least one data collection agent is identified based on a task schedule or an on-demand command received from the server, the task schedule or the on-demand command indicating one or more data collection tasks corresponding to the at least one data collection agent.

13. The method of claim 11, wherein the first parameter values are different than default parameter values associated with a communication protocol used to communicate the masked traffic.

14. The method of claim 11, further comprising:

based on the at least a portion of the cybersecurity data failing to satisfy the one or more criteria, dynamically updating the first parameter values based on the cybersecurity data.

15. The method of claim 11, further comprising:

masking an internet protocol (IP) address of the server from one or more packets for transmission to the network target to generate the masked traffic.

16. The method of claim 11, wherein the first parameter values correspond to a timing alignment parameter, a frequency parameter, metadata used to obtain cybersecurity data, or a combination thereof.

17. A non-transitory computer-readable storage medium storing instructions that, when executed by one or more processors, cause the one or more processors to perform operations for distributed cybersecurity data collection and traffic masking, the operations comprising:

determining, with a server, a plurality of different logical groups for a plurality of different node devices based on characteristics of the plurality of different node devices, wherein the characteristics comprise at least one of device types, hardware of the plurality of different node devices, or applications supported by the plurality of different node devices;

determining, with the server, to assign a plurality of different respective data collection tasks to the plurality of different logical groups;

receiving, by a first node device assigned to a first logical group of node devices that is associated with a first set of characteristics, an executable file package including one or more data collection agents;

identifying at least one data collection agent of the one or more data collection agents to be executed to perform a data collection task;

executing the at least one data collection agent based on first parameter values to initiate communication of masked traffic to a network target to obtain cybersecurity data about the network target, the first parameter values selected based on the first set of characteristics;

transmitting the cybersecurity data to the server;

processing the cybersecurity data to determine at least one of data collection was blocked or improper data was received, wherein determining the at least one of data collection was blocked or improper data was received comprises: comparing the cybersecurity data to one or more criteria and based on the at least a portion of the cybersecurity data failing to satisfy the one or more criteria, terminating communication of the masked traffic to the network target; and in response to determining at least one of the data collection was blocked or the improper data was received, dynamically adjusting the first parameter values to continue a respective data collection task, wherein adjusting comprises changing at least one of a frequency between scans or a timing alignment parameter value.

18. The non-transitory computer-readable storage medium of claim 17, wherein the operations further comprise modifying the first parameter values based on changes to the first set of characteristics.

19. The non-transitory computer-readable storage medium of claim 17, wherein the operations further comprise:

identifying a second data collection agent of the one or more data collection agents to be executed to perform a second data collection task; and executing the second data collection agent based on second parameter values to initiate communication of second masked traffic to a second network target to obtain additional cybersecurity data about the network target, the second parameter values selected based on the first set of characteristics and the second data collection task.

* * * * *